US012077662B2

(12) United States Patent
Schad et al.

(10) Patent No.: US 12,077,662 B2
(45) Date of Patent: Sep. 3, 2024

(54) LOW DENSITY COLORED COMPOSITION AND METHODS OF MAKING

(71) Applicants: H.B. Fuller Construction Products, Inc., St. Paul, MN (US); H.B. Fuller Company, St. Paul, MN (US)

(72) Inventors: Gregory W. Schad, Cary, IL (US); David Eckert, Palatine, IL (US); Kevin P. Del Bene, Downers Grove, MN (US); Brian W. Carlson, Woodbury, IL (US); Bronwyn T. Miller, Belvidere, IL (US)

(73) Assignees: H.B. Fuller Construction Products, Inc., St. Paul, MN (US); H.B. Fuller Company, St. Paul, MN (US)

( * ) Notice: Subject to any disclaimer, the term of this patent is extended or adjusted under 35 U.S.C. 154(b) by 100 days.

(21) Appl. No.: 17/649,131

(22) Filed: Jan. 27, 2022

(65) Prior Publication Data

US 2022/0235214 A1 Jul. 28, 2022

Related U.S. Application Data

(60) Provisional application No. 63/142,076, filed on Jan. 27, 2021, provisional application No. 63/142,089, filed on Jan. 27, 2021.

(51) Int. Cl.

| C09K 3/10 | (2006.01) |
|---|---|
| C08K 7/22 | (2006.01) |
| C08L 33/04 | (2006.01) |
| C09D 5/02 | (2006.01) |
| C09D 7/62 | (2018.01) |
| C09D 133/04 | (2006.01) |

(52) U.S. Cl.
CPC .............. *C08L 33/04* (2013.01); *C08K 7/22* (2013.01); *C09D 5/022* (2013.01); *C09D 5/028* (2013.01); *C09D 7/62* (2018.01); *C09D 133/04* (2013.01); *C09K 3/10* (2013.01); *C08L 2201/52* (2013.01); *C08L 2205/025* (2013.01); *C08L 2205/03* (2013.01); *C08L 2205/14* (2013.01); *C09K 2200/0625* (2013.01)

(58) Field of Classification Search
CPC ........................................................ C08K 7/22
USPC ........................................................ 523/218
See application file for complete search history.

(56) References Cited

U.S. PATENT DOCUMENTS

| 3,615,972 | A | * | 10/1971 | Morehouse, Jr. ........... C08J 9/32 |
|---|---|---|---|---|
| | | | | 523/210 |
| 5,607,993 | A | | 3/1997 | Christy |
| 8,409,683 | B2 | * | 4/2013 | Kosaka ..................... C09J 7/38 |
| | | | | 428/317.1 |
| 8,802,750 | B2 | | 8/2014 | Abrami et al. |
| 9,725,636 | B2 | | 8/2017 | Amos et al. |
| 2002/0062764 | A1 | | 5/2002 | Audibert et al. |
| 2005/0065240 | A1 | * | 3/2005 | Kyte ............................ C08J 9/32 |
| | | | | 523/218 |
| 2005/0197444 | A1 | | 9/2005 | Kyte et al. |
| 2016/0257620 | A1 | | 9/2016 | Peters et al. |
| 2017/0190864 | A1 | | 7/2017 | Kocurek et al. |

FOREIGN PATENT DOCUMENTS

| CA | 2467235 | | 11/2005 |
|---|---|---|---|
| CN | 101302360 | | 5/2011 |
| CN | 202089896 | | 12/2011 |
| CN | 104018143 | | 9/2014 |
| CN | 103305716 | | 2/2015 |
| CN | 105623638 | | 6/2016 |
| CN | 103725276 | | 8/2016 |
| CN | 106280655 | | 1/2017 |
| CN | 106433225 | | 2/2017 |
| CN | 109401280 A | * | 3/2019 |
| CN | 106512874 | | 4/2019 |
| CN | 108299861 | | 11/2020 |
| EP | 0324242 | | 10/1991 |
| EP | 2070671 | | 6/2009 |
| JP | 2001064481 | | 3/2001 |
| JP | 2006274765 | | 10/2006 |
| KR | 1662721 | | 10/2016 |
| RU | 2652040 C1 | | 4/2018 |
| WO | WO01/14273 | | 3/2001 |

OTHER PUBLICATIONS

Bang Laboratories, Inc, "Working with Microspheres". Article—TechNote 201-2013, pp. 1-16. Indiana, USA.
Cospheric LLC, "Coated Glass and Silica Precision Microspheres" Product Information, Sep. 2018, pp. 1-4.
Cospheric LLC, "Coatings used on Microspheres for Various Applications" Article. Sep. 2018, pp. 1-7.
Prizmalite Industries Inc., "Glass Micropheres" 2013, pp. 1-2.
Bang Laboratories, Inc, "Absorption to Microspheres" . Article—TechNote 204-2013, pp. 1-5. Indiana, USA.
3M, "Glass Bubbles K Series, S Series and iM Series", Product Information, 2013, pp. 1-4, USA.

(Continued)

*Primary Examiner* — Vickey Nerangis
(74) *Attorney, Agent, or Firm* — Daniel J. Barta; Kirsten Stone

(57) ABSTRACT

A colored composition including a resin system, and a colorized filler. The colorized filler includes particles including a polymer. The particles have a density less than 2.6 g/cc and an average particle size from 100 microns to 600 microns.

13 Claims, 15 Drawing Sheets

(56) References Cited

OTHER PUBLICATIONS

Poraver North America Inc., "Poraver® X" Technical Data Sheet, p. 1, 2016 Ontario, Canada.
Henkel, "DUALITE®" Product Information, p. 1, Jul. 2011, South Carolina, USA.
AGSCO Corporation, "Spheriglass® Beads, Glass Beads, Crushed Glass" Safety Data Sheet 2017, pp. 1-4, USA.
AGSCO Corporation, "Polymer Vinyl Chips", Safety Data Sheet 2015, pp. 1-2 USA.
AGSCO Corporation, "Decorative Vinyl Color Chips/Flakes" Technical Data Sheet 2013, pp. 1-2, USA.
AGSCO Corporation, "Hybrid Stone FLAKE" Product Information—Catolog 2020, USA.
AGSCO Corporation, "Rubber ColorCrumbs®" Safety Data Sheet 2016, pp. 1-3, USA.

\* cited by examiner

LOW DENSITY COLORED COMPOSITION AND METHODS OF MAKING

This application claims the benefit of U.S. Provisional Patent Application No.: 63/142,076 filed on Jan. 27, 2021 and U.S. Provisional Patent Application No.: 63/142,089 filed on Jan. 27, 2021, which are incorporated herein.

FIELD

The present disclosure relates to low density colored components, low density colored compositions, and methods of making. More particularly, the present disclosure provides a low density colored composition that is suitable for use with construction materials, and provides a method of applying a colored coating to the outer surface of microparticles.

BACKGROUND

A process for finishing a wall or floor of a structure may include the use of construction material positioned on the wall or floor to create a final surface. Construction materials that may be used for surfacing include laminates, bricks, stone, and tiles, among others. Generally, tiles may be made of wood, ceramic, marble, glass, granite, or any suitable material that provides a desired characteristic such as aesthetics, wear resistance, high gloss, chemical resistance, or ease of cleaning. A construction material such as tile may be applied to a wall or floor using a composition suitable as a binder. The binder may be applied by a user to the floor or wall to be surfaced and tiles can be placed with the backs of the tiles in contact with the binder and the faces of the tiles positioned away from the binder. The binder may be permitted to harden and set with the tiles in place. The binder can be used to fill in the spaces formed between adjacent tiles. In some applications, a binder may be used as a filler. In some applications, a binder may be used to fill the spaces formed between adjacent tiles.

One example method of laying tiles includes grouting. When tiles are applied, the tiles may be positioned with a space defined between adjacent tiles. In some instances, this space may be from about an eighth of an inch to as great as an inch. The spaces between the tiles may be filled in with a grouting material. In general, grouting includes applying a uniform line of grouting material in the space between adjacent tiles. The grouting material can be worked into the spaces between the tiles and then scraped or leveled until it is at the proper height between adjacent tiles. Any excess grouting material that has been disposed on the faces of the tiles can be removed from the face of the tiles by wiping the tiles.

There are certain difficulties with applying binders or sealants such as grouting, some which require skill and experience to avoid damaging the tiles or creating an undesired final product. For example, cleaning of the tiles after grouting can be a laborious task to remove all the grout from the face of the tiles, and certain binders or sealants may lead to undesired coloration of the tiles. Binder or sealant material may be very dense, making transportation of the binder or sealant material difficult.

In certain commercially available examples, the composition is colored by adding a chemical additive, such as a dying chemical or colorant into the composition. Colored compositions may be difficult to form with consistent coloration. For instance, the composition may have poor distribution of colorant throughout the composition. In some instances, the bleeding may result in inconsistent color uniformity of the composition.

These colorants often have the added drawback of running or bleeding out of the composition. As a result, certain compositions will mark or stain the substrates to which the composition is applied, even after remaining composition has been wiped off the substrate. For example, when applying grout to tiles, the coloring from the grout that remains after the grout has been wiped off is often referred to as "grout haze." To try to prevent this, grout producers will often add bleeding reducers to the grout to inhibit the colorant from bleeding out of the grout composition. This leads to the added drawback of having to provide additional components to the grout composition which may lead to unwanted side effects and often increases the cost of the grout composition.

Furthermore, after the grout composition has been applied, a user must clean the grout haze from the tiles that it has been applied to. In some instances, the cleaning step even requires using specific cleaning materials. As a result, a user must go through the added step of cleaning the tiles, leading to additional processing time for applying the grout and the user also may have to buy these specialized cleaning products.

Typically, various compositions include a filler material. One known material for producing filler is sand. Sand may be used as a filler in various compositions; however, sand is quite dense and can contribute significantly to the overall weight of the composition. Compositions that include sand may be very heavy, making transportation of the composition difficult.

It has also been found that in some instances, filler materials such as sand have high hardness values and can abrade certain construction materials when being applied.

There is a need for a low density colored composition suitable for uses such as for a sealant, a filler, or a binder. There is a need for a low density colored component suitable for use with compositions such as sealants or binders. There is a need for a low density colored filler for use in a low density colored composition and a method of forming the same. There is also a need for a low density colored composition that has a consistent coloration, is easy to clean up, and is minimally abrasive.

SUMMARY

Disclosed herein is a colored composition that includes a resin system, and a colorized filler. The colorized filler can include particles including a polymer. The particles have a density less than 2.6 g/cc. In some embodiments, the particles have an average particle size from 100 microns to 600 microns.

In some instances, the particles have a density less than 2.0 g/cc. In some instances, the resin system includes a liquid polymeric binder. In some instances, the resin system includes a two-part epoxy, a two-part polyurethane, or a combination thereof. In some instances, the resin system includes a reactive binder. In some instances, the resin system includes, polyacrylate, epoxy, polyurethane, or a combination thereof.

In some instances, the colorized filler includes a plastic, rubber, latex, vinyl, or a combination thereof. In some instances, the colorized filler includes polyester, polycarbonate, polylactide, polyacrylate, or a combination thereof. In some instances, the colorized filler includes polyethylene terephthalate, polyvinyl chloride, high density polyethylene, low density polyethylene, polypropylene, polystyrene, polylactide, acrylonitrile butadiene, acrylonitrile butadiene styrene, fiberglass, nylon, or a combination thereof.

In some instances, the colored composition is at least one of a joint filler, a grout, or a sealant.

In some instances, the density of the colored composition is less than 1.6 kg per liter (about 13 lbs per gallon). In some instances, the density of the colored composition is less than 1.5 kg per liter (about 12.5 lbs per gallon). In some instances, the density of the colored composition is less than 1.4 kg per liter (about 11.7 lbs per gallon). In some instances, the colorized filler is present in an amount from 10 percent to 70 percent by weight of the colored composition.

Also disclosed herein is a method of forming a colored composition. The method includes combining a resin system and a colorized filler to form the colored composition. The colorized filler includes particles having a mean particle size from 100 microns to 600 microns and includes an organic polymer having a density less than 2.6 g/cc.

In some instances, the method includes combining particles that include an organic polymer having a density less than 2.0 g/cc. In some instances, the resin system is a liquid polymeric binder. In some instances, the resin system includes a two-part epoxy, a two-part polyurethane, or a combination thereof. In some instances, the resin system includes an epoxy, a polyurethane, a polyacrylate, or a combination thereof.

In some instances, the method includes combining colored filler including plastic, rubber, vinyl, latex, or a combination thereof. In some instances, the colorized filler includes a polyethylene terephthalate, polyvinyl chloride, high density polyethylene, low density polyethylene, polypropylene, polystyrene, polylactide, acrylonitrile butadiene, acrylonitrile butadiene styrene, fiberglass, nylon, or a combination thereof. In some instances, the colored composition is a joint filler, a grout, or a sealant.

In some instances, the density of the colored composition formed with the method is less than 1.6 kg per liter (about 13 lbs per gallon). In some instances, the density of the colored composition is less than 1.4 kg per liter (about 11.7 lbs per gallon).

Disclosed herein is a low density colored component including a plurality of microparticles. Each of the microparticles has an outer surface and a first coating disposed on the outer surface of the microparticles. The first coating includes a coating material and a coloring agent. The low density colored component has a density less than 2.6 g/cc.

In some instances, the low density colored component has a density less than 2.0 g/cc. In some instances, the microparticles are formed of glass, ceramic, silica, a polymeric material, or combinations thereof. In some instances, the coloring agent is at least of a pigment or a dye.

In some instances, the coating material includes at least one of a polyacrylate, an epoxy, or a urethane. In some instances, the coloring agent is adhered to the outer surfaces of the microparticles with at least one of a two part polyurethane or a two component epoxy system. In some instances, the microparticles are hollow. In some instances, the microparticles are microspheres. In some instances, the microparticles have a mean particle size of from about 0.1 μm to about 500 μm. In some instances, the microparticles have a mean mesh size less than 500 microns (μm).

Also disclosed herein is a low density grout composition including a resin system and the low density colored component. In some instances, the low density grout composition is a colored non-cementitious grout composition. In some instances, the low density grout composition has a density less than 1.8 kg/L. In some instances, the low density grout composition has a density less than 1.0 kg/L.

Also disclosed herein is a method of forming a low density colored component. The method includes combining a plurality of microparticles, a coating material, and a coloring agent to form a mixture. Each of the microparticles defines an outer surface. The method includes curing the coating material such that the coloring agent is adhered to the outer surface of the microparticles and agitating the mixture.

In some instances, the method includes using microparticles that are microspheres. In some instances, the microparticles are hollow. In some instances, the curing step includes heating the coating material. In some instances, the step of agitating the mixture is carried out during the step of curing the coating material. In some instances, the low density colored component is a free flowing particulate. In some instances, the coating material includes at least one of a polyacrylate, an epoxy, or a urethane. In some instances, the coating material and the coloring agent are combined before the step of combining the plurality of microparticles with the coating material and coloring agent.

Also disclosed herein is a method of forming a low density colored component, which includes combining a plurality of microparticles having a density less than 2.6 g/cc, a coating material, and a coloring agent to form a mixture. Each of the microparticles define an outer surface. The method includes drying the coating material such that the coloring agent is adhered to the outer surface of the microparticles, and agitating the mixture.

In some instances, the method includes using microparticles that are microspheres. In some instances, the microparticles are hollow. In some instances, the drying step includes heating the coating material. In some instances, the agitating step is carried out during the step of drying the coating material. In some instances, the coating material includes at least one of a polyacrylate, an epoxy, or a urethane. In some instances, the coating material and the coloring agent are combined before the step of mixing the plurality of microparticles with the coating material and coloring agent.

GLOSSARY

Figure 1:
FIG. 1 is a photograph of a tile array with pigmented grout composition between the tiles on the left side of the figure and a grout composition containing colored sand between the tiles on the right side of the figure.

As used herein, the term "resin system" is defined as a polymer, oligomer, crosslinkable monomer, polymerizable monomer, or a combination thereof.

As used herein, the term "a microparticle" is a microscopic particle formed of a shell material.

As used herein, the term "a microsphere" is a microparticle that has a three dimensionally rounded shape.

As used herein, the term "outer surface of the microparticles" refers to the outer surface of individual microparticles rather than an outer surface defined by a group of microparticles grouped together into a single unit.

As used herein, the term "coat weight" refers to the thickness of a coating disposed on a surface of a substrate.

As used herein, the term "uncured resin" refers to resin materials that are partially or completely uncured.

DETAILED DESCRIPTION

Disclosed herein is a low density colored composition suitable for use with construction material. The low density colored composition has a consistent coloration, is easy to clean up, and is low abrasion.

The low density colored composition includes a base component and a colorized filler.

The Base Component

The base component may be any substance that can be in liquid or semi-liquid form (such as a paste), and that can harden (e.g., cure, dry, polymerize, crosslink, or react) to form a solid material. Useful examples of the base component include substances that are liquid before being associated with the colorized filler. Suitable examples of the base component include substances that can be combined with the colorized filler to form a colored composition that can be applied in a workable form, such as a liquid, paste, or putty before the colored composition has hardened. The base component may be any composition that can be combined with the colorized filler to form any of a joint filler, caulk, or a grout.

In some embodiments, the base component can be fully transparent or partially transparent. That is, the base component may have a level of transparency from fully transparent to any degree of transparency such that a colorized filler embedded within the base component can be seen. In some embodiments, the base component can be opaque.

The base component includes a resin system. The resin system may include a monomer that contains reactive groups that can react to form a polymer. The resin system may be a polymerizable organic compound, e.g., a polymer, a pre-polymer, an oligomer, a crosslinkable monomer, a polymerizable monomer, and combinations thereof. Useful classes of resin systems include reactive compositions, thermoplastic compositions, thermoset compositions, polymeric binders (e.g., acrylic emulsions), reactive binders, and combinations thereof. The base component may include a pre-polymer, a polymer component, and combinations thereof. Useful examples of polymers suitable for use in the resin system include, e.g., urethanes, polyacrylates, thermoplastic polymers, thermoset polymers, and combinations thereof. The resin system can be in a variety of forms including, e.g., emulsion, suspension, dispersion, and solution.

Examples of suitable thermoset resin systems include epoxies (e.g., two-part epoxies), urethanes (e.g., one-part urethanes or two-part urethanes), and combinations thereof. One example of a suitable urethane is a one-part moisture cure urethane.

Other resin systems include, for example, elastomers such as polyurea, (e.g an aliphatic polyurea such as polyaspartic), silicone, silane terminated polymers (e.g., silane terminated urethane), and combinations thereof.

The resin system optionally includes a solvent. Suitable solvents include, e.g., water, volatile organic solvents (e.g., alcohols (e.g. ethanol, methanol, isopropanol, and combinations thereof)), ester alcohol, and combinations thereof.

The Colorized Filler

The colorized filler includes a filler material and is colorized.

As used herein, colorized means that the component is formed of a material that has a color, includes a coloring agent disposed on the outer surface of particles of the component, includes a coloring agent dispersed throughout the component, such as dispersed throughout the material that forms the component, or a combination thereof. As used herein, a coloring agent includes any substance that imparts a color to another material. Color includes light with a wavelength that falls within the visual spectrum. As used herein, color can include white, grey, black, and shades of the colors that fall within the visual spectrum.

The Filler Material

The filler includes any suitable material that can be formed into particles such as beads or a powder. The filler material can include plastic, vinyl, latex, rubber, glass, ceramic, silica, and combinations thereof.

In some embodiments, the filler includes an organic material. Examples materials that are suitable for use as the filler material include polymers such as polyesters, polycarbonates, polylactides, polyamides, polyacrylates, and combinations thereof. Further examples of materials suitable as the filler material include polymers such as polyethylene terephthalate, polyvinyl chloride, high density polyethylene, low density polyethylene, polypropylene, polystyrene, polylactide, acrylonitrile butadiene, polystyrene, acrylonitrile butadiene polystyrene, fiberglass, nylon, and combinations thereof.

Examples materials that may be suitable for use as the filler material include recycled materials such as recycled plastics or rubber. For example, a recycled material may be a material that was formed into a first composition, such as a plastic, has been used at least once for a first application, and then is used for a second application without changing the chemical composition of the material. Recycled materials that may be suitable for use as the filler material include plastics that have been used in a household or commercial item, after which the plastic has been ground down into particles or powder to be used as a filler. In some embodiments, the recycled material may be melted and solidified before being ground into particles or a powder. Recycled materials that may be suitable for use as the filler material include polymers such as polyester, polycarbonate, polylactide, polyacrylate, or combinations thereof. Further examples of recycled materials that may be suitable for use as the filler material include recycled polyethylene terephthalate, polyvinyl chloride, high density polyethylene, low density polyethylene, polypropylene, polystyrene, polylactide, acrylonitrile butadiene, acrylonitrile butadiene polystyrene, fiberglass, nylon, and combinations of at least two different recycled materials.

In some embodiments, the filler material can be in a variety of forms including microparticles, such as microspheres. The filler material may include microspheres having a shell material in a variety of forms such as solid, porous, or hollow.

Suitable fillers exhibit a density from greater than 0 g/cc, from about 0.5 g/cc, or from about 1.0 g/cc, to about, 1.5 g/cc, about 2.0 g/cc, about 2.5 g/cc, or a density between any pair of the foregoing values. In some embodiments, particularly useful fillers have a density no greater than 2.6 g/cc, no greater than 2.0 g/cc, or even no greater than 1.0 g/cc.

The Coloring Agent

Suitable coloring agents include pigments, dyes, and combinations thereof. The coloring agent may be any organic or inorganic substance that imparts a color to another material. The coloring agent may impart an opaque or transparent coloration to the material it is associated with. Useful coloring agents include those that have a high heat resistance, high resistance to pigment bleeding and migration, light fastness, and weatherability.

Stable pigments are useful as coloring agents as they have certain desirable characteristics such as high heat resistance, and high resistance to pigment bleeding and degradation, even after being mixed with organic compositions. In some instances, useful pigments include those formed from inorganic materials (e.g., materials that do not contain carbon). In some instances, inorganic pigments are quite stable in the presence of organic compositions such as organic solvents. In some embodiments, suitable inorganic pigments include those that render opaque the material with which the pigment is mixed.

Inorganic materials suitable as a pigment may include metallic salts. Examples of suitable pigments that may be used as the coloring agent include metallic salts, metal oxides (including, e.g. titanium dioxide, iron oxide, chromium oxide, and manganese oxide), and combinations thereof. Further examples of suitable pigments include carbon black, lamp black, cadmium, lead chromate, ultramarine blue, iron blue, chrome green, phthalto chrome green, bivandante, and combinations thereof. Examples of suitable pigments include pigments made up of combinations of various minerals and elements chemically or physically bonded together and often known by a common name such as ultramarine violet which is a silicate of sodium and aluminum containing sulfur, Persian blue (lapis lazuli), Prussian blue (ferric hexacyanoferrate), malachite (cupric carbonate hydroxide), yellow ochre (clay of monohydrated ferric oxide), chrome orange (mixture of lead chromate and lead(II) oxide), and others such as vermillion, raw umber, minium (red lead), burnt Sienna, orpiment, green earth, han blue, and combinations thereof.

In some embodiments, suitable pigments may be formed into particles having an average size between about 400 nm and 800 nm.

In some instances, suitable dyes for use as a coloring agent include those formed from organic materials (e.g., materials that contain carbon). In some embodiments, organic pigments or dyes include those based on carbon chains or carbon rings and may include inorganic elements such as metals or metallic compounds that can help stabilize the organic component of the pigment. Suitable organic dyes include those that are stable in the presence of organic compositions including organic solvents. In some embodiments, the material that the dye is mixed with maintains a certain degree of transparency after being mixed with the organic pigment or dye.

Organic materials suitable as a coloring agent include azo pigments, polycyclic pigments, and combinations thereof. Examples of suitable organic azo pigments include monoazo yellow, monoazo orange, diazo, diazo condensation, naphthol, naphthol AS, azo lakes, benzimidazolone, organic materials that include metal complexes, and combinations thereof. Examples of suitable organic polycyclic pigments include phthalocyanine, quinacridone, perylene, perinone, thioindigo, anthraquinone, dioxazine, isoindolinone, isoindoline, diketo-pyrrolo-pyrrole (DPP), triarylcarbonium, quinophthalone, and combinations thereof. Examples of suitable dyes include those known by a common name such as alizarin (turkey red), crystal violet, methyl red, rose bengal, titan yellow, purpurin, and combinations thereof.

Inorganic materials that may be suitable for use as a coloring agent include pigments commercially available under the trade designations STAPA METALLUX 212 (aluminum paste) or PHOENIX PX5310 (pearlescent) (both available from Eckart America Corp., located in Louisville, KY) and BLACK OLIVE 9000Z or MEARLIN Sparkle Bronze 9250J (both available from BASF, located in Ludwigshafen, Germany).

Examples of suitable pigments or dyes may include those classified by the Society of Dyers and Colourists on the COLOUR INDEX (CI) by a generic name and an identification number that summarizes its properties. In some examples, suitable pigments or dyes may be those that have been allocated a constitution number on the CI.

In some instances, suitable pigments or dyes that make up the coloring agent may be incorporated into the filler material by one or both of physical mixing with the filler material or coating or adhering to the outer surface of a particle formed from the filler material. In some embodiments, certain suitable pigments or dyes may be soluble in the filler material.

In some embodiments, the colorized filler may be formed into particles. For example, the filler material may be physically mixed with the coloring agent while the filler material is a liquid. The filler material may then be allowed to harden with the coloring agent dispersed throughout the filler material. The filler material having the coloring agent can then be broken up, crushed, or ground into particles to form the colorized filler.

In some embodiments, the filler material can be formed into particles which are then colorized, for example by adhering (e.g., binding, coating, encapsulating, and combinations thereof) the coloring agent to the outer surface of the filler material particles. For example, the coloring agent may be adhered to the outer surface of particles of the filler material with a coating material. Useful classes of coating materials include, e.g., resin systems, thermoplastic compositions, thermosetting compositions, curable compositions, (e.g., UV curing, e-beam curing, moisture curing), water-based systems, solvent based systems (e.g., organic solvent-based systems), and combinations thereof.

In some embodiments, the colorized filler may be particles having a mean particle size from about 50 microns, 100 microns, about 200 microns, or about 300 microns, to about 400 microns, about 500 microns, about 600 microns, or about 700 microns, or a mean particle size between any pair of the foregoing values. In round or symmetric particles, the particle size may be measured as the diameter of the particle. For example, the colorized filler may be beads of colored filler material, such as colored plastic beads. The colorized filler may be round beads of colorized filler, and the beads may have an average outer diameter of from about 50 microns, 100 microns, about 200 microns, or about 300 microns, to about 400 microns, about 500 microns, about 600 microns, or about 700 microns, or a diameter between any pair of the foregoing values. In non-symmetrically shaped particles, the size of each particle may be the distance between two locations on the outer surface of the particle that are farthest from each other. In some embodiments, the colorized filler may be particles of colorized filler having a mean mesh size from about from about 50 microns, 100 microns, about 200 microns, or about 300 microns, to about 400 microns, about 500 microns, about 600 microns, or about 700 microns in width.

The density of the colorized filler is measured as the total mass of the sample of colorized filler divided by the volume of the sample of colorized filler. Typically, the density of the colorized filler can be measured in a liquid form, or if in a solid form it can be measured with the colorized filler as a continuous body, which may be referred to as monolithic or existing as a single unit (in other words not separated into multiple distinct particles). In contrast, the term "bulk density" refers to the property of powders, granules, particles and other divided solids, and is defined as the mass of many particles of the material divided by the total volume they occupy. The total volume used to calculate the bulk density of, for example a powder, includes the particle volume, inter-particle void volume, and internal pore volume.

In some embodiments, the density of the colorized filler is from greater than 0 g/cc, about 0.5 g/cc, or about 1.0 g/cc to about, 1.5 g/cc, about 2.0 g/cc, about 2.5 g/cc, or a density between any pair of the foregoing values. Suitable examples of the colorized filler include those having a specific gravity from 0.8 to 2.3. Particularly useful embodiments of the colorized filler include those having a density no greater than 2.0 g/cc, or even no greater than 1.0 g/cc. Plastics such as polyethylene terephthalate, polypropylene, low density polyethylene, polyvinyl chloride, high density polyethylene, or polyamide that may be suitable as a filler material include those having a density less than 2.0 g/cc.

Optional Additives

The colored composition optionally includes a variety of other additives including, e.g., open time extenders, diluents, adhesion promoters, hydrophobic additives, co-solvents, freeze additives, biocides, non-polymeric fillers, defoamers, thickeners, surfactants (e.g., nonionic, cationic and anionic surfactants), extenders, preservatives, plasticizers, silane coupling agents, alkyl polysilicates, stain resistant additives, UV stabilizers, and combinations thereof.

Useful thickeners include, e.g., cellulose ether, xanthan gum, gum arabic, guar gum, protein derived polymers, starches and casein derived polymers, ethers, hydroxymethyl cellulose, hydroxyethyl cellulose, fibers, fumed silica, alkali swellable thickeners, and combinations thereof.

Useful stain resistant additives include, e.g., wax emulsions, wax particles, fluoro-carbon based particles and emulsions, silicone-based particles and emulsions, hydrophobes (e.g., oleates and stearates) and combinations thereof.

Useful biocides include those commercially available under the trade name ACTICIDE (available from Thor Specialties, Inc., located in Shelton, CT). The optional biocide may be present in the composition in an amount of from greater than 0% by weight to about 0.02% by weight.

The base component and the colorized filler are combined to form the low density colored composition. For example, the low density colored composition is formed by combining the colored composition, the base composition, and optionally any of the optional additives, such that the colored composition is dispersed throughout the base composition.

In general, any suitable method for combining the colored composition and the base composition such that the colored composition imparts coloration to the composition, and that the low density colored composition is a liquid or paste can be used. For example, the base composition can be a liquid and the colored composition can be colored plastic beads that are then physically mixed to form a liquid low density colored composition. The low density colored composition can be prepared such that the colorized filler is present in an amount from 10 percent, about 20 percent, about 30 percent, to about 40 percent, about 50 percent, or about 70 percent by weight of the colored composition, or a weight percent between any pair of the foregoing values.

In some embodiments, the density of the colored composition exhibits a density less than 1.8 kg per liter (about 15.0 lbs per gallon). For example, the density of the colored composition may be from greater than 0.0 kg per liter, from about 0.6 kg per liter (about 5 lbs per gallon), about 0.9 kg per liter (about 7.5 lbs per gallon), about 1.0 kg per liter (about 8.3 lbs per gallon), about 1.1 kg per liter (about 9.2 lbs per gallon), about 1.2 kg per liter (about 10 lbs per gallon), or about 1.3 kg per liter (about 10.8 lbs per gallon), to about 1.4 kg per liter (about 11.7 lbs per gallon), about 1.5 kg per liter (about 12.5 lbs per gallon), or about 1.6 kg per liter (about 13.4 lbs per gallon), or a density between any pair of the foregoing values, although additional densities are further contemplated. In a particularly useful embodiment, the density of the colored composition is less than 1.6 kg per liter (about 13.4 lbs per gallon).

Typically, the low density colored composition is prepared before a user applies it to a construction material. The colored composition may be prepared in situ, e.g., as it is being applied, or at the work site immediately before being applied. In some embodiments, the low density colored composition may be prepared some time before being applied to construction material, for example it may be formed as part of a batch process, and then transported to the work site in a container. The low density colored composition may be prepared and supplied as a one-part binder, such that a user can apply the low density colored composition as it is supplied without a need for further preparation, such as mixing with another component such as water. It is also contemplated that the low density colored composition may be prepared such that a reactive component is added to the low density colored composition immediately before it is applied to initiate a reaction that causes the colored composition to harden.

Generally, since the low density colored composition contains the base component which may harden by reacting or drying if left under certain conditions, the low density colored composition may be prepared and then transported to the work site in suitable containers. The containers may be designed to prevent the low density colored composition from hardening, even when stored for long periods of time of days, weeks, or months. Suitable storage conditions may be implemented such that the low density colored composition does not harden before being applied.

The low density colored composition can be formulated in a variety of forms, including e.g. a liquid, a putty, or paste, that is suitable for application into small spaces. In some embodiments, the low density colored composition is a premixed-composition, ready to apply, and free flowing. The low density colored composition is suitable for a variety of functions including e.g. a binder, a filler, a sealant, a grout. For example, the low density colored composition may be useful as a binder for holding construction material together. The low density colored composition may be useful for binding tiles to a surface, such as to the surface of the walls or a floor of a building. The low density colored composition may be suitable for filling spaces between construction materials. The low density colored composition may be useful for filling spaces between construction materials (e.g. tiles) applied to walls or a floor of a building. The low density colored composition may be suitable for sealing gaps between construction materials (e.g. bricks, cinderblocks, or tiles). The low density colored composition may be useful for sealing a gap defined between adjacent tiles such that water is inhibited from entering the gap (e.g. water proof sealant).

The low density colored composition may be useful for use in patches and putties, for example water proof putties for bathroom surfaces or marine applications (e.g. a waterproof filler, an air tight filler, or sealant). The low density colored composition may be useful for use in flooring materials, such as a floor lining. The low density colored composition may be a non-cementitious grout composition, such as a one-part grout.

The compositions disclosed herein provide a low density filler material, suitable for use as a filler, such as in a low density grout composition. Grout compositions are often packaged and provided to an end user as a premade, one-part composition, and the volume of the composition is typically a set value. As a result, a low density composition that occupies the same volume will be lighter and can help make transportation and storage less costly and can help make the composition easier to apply.

The colorized filler described herein can be used to form a grout that can be formulated such that the grout can be minimally or free of abrasion when the grout composition is wiped across the face of construction material such as tiles. It has been found that using a filler material that has a suitable hardness level, for example lower than that of substrate that the colored composition is wiped against, a user can wipe the colored composition against the substrate (e.g., when cleaning up the colored composition) without abrading the surface of the substrate. Organic polymers such as plastic and rubber have been found to be suitable as a filler material and exhibit minimal abrasion or are abrasion free when wiped along certain substrates such as tiles. Using the colorized filler disclosed herein to form a colored composition, a user can apply the composition to tiles, and the excess colored composition can be wiped off without scratching the face of the tiles.

The compositions disclosed herein exhibit good color consistency and easy clean up after being applied. It has been found that in some instances if a coloring agent is bound to a filler, the coloring agent can be inhibited from bleeding out of the base component because the coloring agent is bound to the filler material. Because the filler material is general present in particle sizes that inhibit it from moving out of the base component, and because the coloring agent is bound to the filler material, the compositions disclosed herein help provide various options for sealants, fillers, and binders that have good color distribution and uniformity throughout the composition even after being applied. It has also been found that a grout composition with colorized filler helps when cleaning the grout composition from the face of a tile because removing the colorized filler removes the coloring agent. Because the coloring agent is inhibited from bleeding out of the low density colored composition, the compositions disclosed herein avoid the need for additional cleaning materials to be used when removing excess composition from construction materials.

Disclosed herein is a low density colored component and a method of forming the same. The low density colored component can include a plurality of microparticles having a colored coating on an outer surface of the microparticles. The low density colored component is useful as a filler material. The low density colored component is suitable for use in a low density colored composition, for example binders and sealants such as grout, caulking, or adhesives.

The low density colored component can include microparticles having a colored coating that includes a coating material and a coloring agent.

The Microparticles

The microparticles can include a shell material. In some embodiments, the shell material forms a solid component of the microparticles. The shell material can be formed from a variety of materials including, e.g., glass, ceramic, silica, a polymer (e.g., acrylonitrile copolymer), and combinations thereof.

A microparticle may define any suitable three dimensional shape including, e.g. a sphere, a pyramid, a cylinder, a rod, a cube, or even have an asymmetrical shape. A microsphere is a microparticle that has any three dimensionally round shape, e.g. a sphere (e.g., a figure with every point on its outer surface equidistant from its center), a globe (e.g., a round figure with every point on its outer surface a distance from its center of no greater than 30% of that another point), an oblong (e.g., a round, non-symmetric figure), or an oval shape (e.g., a round figure with an aspect ratio of no greater than 10:1).

In general, the shell material defines the outer surface of the microparticle. The volume enclosed by the outer surface of the microparticle defines the volume of the microparticle, i.e., the particle volume.

In some embodiments, the microparticles are hollow. That is, the microparticles may include an internal space enclosed by the shell material, and which may be occupied by a gas such as air. In some embodiments, the internal space defines a hollow volume. The hollow volume may occupy a volume that is at least 10 percent of the volume of the microparticle, at least 20 percent, at least 30 percent, at least 40 percent, to as great as 50 percent, 60 percent, 70 percent, 80 percent, 90 percent, or as great as 95 percent of the volume of the microparticle, or a percent between any pair of the foregoing values.

In some embodiments, the microparticles may include at least one void bounded by the shell material. As used herein, a void is an absence of the shell material located within an outer perimeter of the space defined by the shell material. A void may be formed by a space filled with a gas, such as air. In some embodiments, the total volume of all voids within a microparticle defines the hollow volume. The hollow volume may occupy from 10 percent of the volume of the microsphere, from 20 percent, 30 percent, or 40 percent to 50 percent, 60 percent, 70 percent, 80 percent, 90 percent, or to 95 percent of the volume of the microsphere, or a volume between any pair of the foregoing values.

In some embodiments, the microparticles have a particle size from about 50 microns, 100 microns, about 200 microns, or about 300 microns, to about 400 microns, about 500 microns, about 600 microns, or about 700 microns, or a particle size between any pair of the foregoing values. When determining the particle size of round particles (including e.g., symmetric particles), for a given quantity of particles, the particle size may be measured as the mean value of the outer diameter of the particles (e.g., the largest outer diameter of the particles). For example, to account for variation in particle size in a given quantity of microparticles, the mean outer diameter of all the microparticles in the given quantity may be from about 50 microns, 100 microns, about 200 microns, or about 300 microns, to about 400 microns, about 500 microns, about 600 microns, or about 700 microns, or a diameter between any pair of the foregoing values.

In non-symmetrically shaped particles, the particle size (e.g., diameter or cross-sectional dimension) of each particle may be measured as the distance between two locations on the outer surface of the particle that are farthest from each other. In some embodiments, the microparticles may be particles having a mean particle size from about 50 microns, 100 microns, about 200 microns, or about 300 microns, to about 400 microns, about 500 microns, about 600 microns, or about 700 microns, or a size between any pair of the foregoing values. In some embodiments, the microparticles may include a mixture of microparticles with different particle sizes.

As used herein, the density of a microparticle is defined as the total mass of the microparticle divided by the volume of the microparticle. The density of the microparticle includes the density of the shell material and takes into account the volume taken up by any voids or materials other than the shell material that make up total volume of the microparticle. In contrast, the term "bulk density" refers to the property of powders, granules, particles, and other divided solids, and is defined as the mass of many particles of the material divided by the total volume they occupy. The total volume used to calculate the bulk density of, for example, a powder, includes the particle volume, inter-particle void volume, and internal pore volume. As used herein, the term "density" is not the bulk density.

In some embodiments, the density of the microparticles is from greater than 0 g/cc, from about 0.2 g/cc, about 0.5 g/cc, about 0.7 g/cc, about 0.1 g/cc, about 0.2 g/cc, about 0.5 g/cc, to about 1.0 g/cc, about, 1.5 g/cc, about 2.0 g/cc, or about 2.5 g/cc, or a density between any pair of the foregoing values. Particularly useful embodiments of microparticles include those having a density less than 2.6 g/cc, no greater than 2.0 g/cc, no greater than 1.0 g/cc, or even no greater than 0.5 g/cc. Particularly useful embodiments of microparticles, e.g., formed from materials such as ceramic or glass, include those exhibiting a density from 0.2 g/cc to 1.25 g/cc. Particularly useful embodiments of microparticles formed from polymeric materials such as plastic include those having a density from 0.03 g/cc to 0.14 g/cc.

Useful examples of microparticles include those having an average crush strength of from about 750 psi, 800 psi, 900 psi, 1000 psi or greater. In general, the type of microparticle used may be those have a suitable average crush strength for desired processing purposes. As an example, materials with a lower crush strength may be processed using a mixer such as a ribbon blender but are generally not suitable for mixing with a high-speed vertical mixer, such as one with a high-shear blade.

In some embodiments, a mixture of microparticles formed from different materials may be suitable. For example, microparticles formed from polymeric material may be mixed with microparticles formed from glass particles. Generally, if a mixture of microparticles is used, the ratio of microparticles from each material may be selected such that a certain characteristic is tuned to achieve a suitable average value.

Examples of microspheres that may be suitable for use as the microparticles include those commercially available under the trade name DUALITE (from Henkel AG & Company, KGaA, in Greenville, SC); the trade name EXTENDOSPHERES SG (from Sphere One, Inc., in Chattanooga, TN); those available under the iM, S, or K series (from 3M Company, in Maplewood, MN); or those available under the trade name PORAVER X (from PORAVER North America Inc., in Innisfil, Ontario, Canada).

The Colored Coating

The colored coating includes a coating material and a coloring agent.

The Coating Material

The coating material may be any substance suitable for adhering (e.g., binding, coating, encapsulating, and combinations thereof) a coloring agent to the outer surface of the microparticles. The coating material may be any material that can be disposed on the outer surface of the microparticles (e.g., to form a layer on the outer surface of the microparticles, including in direct contact with the outer surface of the microparticles, around the coloring agent which may be disposed directly on the outer surface of the microparticles, and combinations thereof).

The coating material can be "workable" by which is meant that the coating material can be worked through a variety of mechanisms including spreading, extruding, spraying, shaping, molding, pumping, forming, agitation (e.g., stirring, mixing, shaking) and combinations thereof. The coating material can be formed into desired dimension and configurations.

Useful classes of coating materials include, e.g., resin systems, thermoplastic compositions, thermosetting compositions, curable compositions, (e.g., UV curing, e-beam curing, moisture curing), water-based systems, solvent based systems (e.g., organic solvent-based systems), and combinations thereof. Useful classes of coating materials include polymer compositions (e.g., emulsion systems, water-based polymers, solvent based polymers, and combinations thereof). Useful classes of coating materials include pre-polymer systems e.g., acrylates, epoxies (e.g., two component epoxy systems), and urethane-based compositions (e.g., two-part polyurethanes).

The Coloring Agent

The coloring agent may be any substance (e.g., an organic substance, inorganic substance, and combinations thereof) that imparts a color to another material. Examples of suitable coloring agents that may be used with the colored coating include pigments and dyes. The coloring agent may impart an opaque, semi-transparent, or transparent coloration to the material it is associated with. Useful coloring agents may include those that have a high heat resistance (e.g., stable at temperatures greater than 100° C.), color fastness (e.g., the coloring agent does not bleed or run after being applied), light fastness (e.g., does not fade when exposed to light), and weatherability, and combinations thereof.

Stable pigments are useful as coloring agents as they have certain desirable characteristics such as high heat resistance, and high resistance to pigment bleeding and degradation, even after being mixed with organic compositions. In some instances, useful pigments include those formed from inorganic materials (e.g., materials that do not contain carbon). In some instances, inorganic pigments are quite stable in the presence of organic compositions such as organic solvents. In some embodiments, suitable inorganic pigments include those that render opaque the material with which the pigment is mixed.

Inorganic materials suitable as a pigment may include metallic salts. Examples of suitable pigments that may be used as the coloring agent include metallic salts, metal oxides (including, e.g., titanium dioxide, iron oxide, chromium oxide, and manganese oxide), and combinations thereof. Further examples of suitable pigments include carbon black, lamp black, cadmium, lead chromate, ultramarine blue, iron blue, chrome green, phthalto chrome green, bivandante, and combinations thereof. Examples of suitable pigments include pigments made up of combinations of various minerals and elements chemically or physically bonded together and often known by a common name such as ultramarine violet which is a silicate of sodium and aluminum containing sulfur, Persian blue (lapis lazuli), Prussian blue (ferric hexacyanoferrate), malachite (cupric carbonate hydroxide), yellow ochre (clay of monohydrated ferric oxide), chrome orange (mixture of lead chromate and lead(II) oxide), and others such as vermillion, raw umber, minium (red lead), burnt Sienna, orpiment, green earth, han blue, and combinations thereof.

In some embodiments, suitable pigments may be formed into particles having an average size between about 400 nm and 800 nm.

In some instances, suitable dyes for use as a coloring agent include those formed from organic materials (e.g., materials that contain carbon). In some embodiments, organic pigments or dyes include those based on carbon chains or carbon rings and may include inorganic elements such as metals or metallic compounds that can help stabilize the organic component of the pigment. Suitable organic dyes include those that are stable in the presence of organic compositions including organic solvents. In some embodiments, the material that the dye is mixed with maintains a certain degree of transparency after being mixed with the organic pigment or dye.

Organic materials suitable as a coloring agent include azo pigments, polycyclic pigments, and combinations thereof. Examples of suitable organic azo pigments include monoazo yellow, monoazo orange, diazo, diazo condensation, naphthol, naphthol AS, azo lakes, benzimidazolone, organic materials that include metal complexes, and combinations thereof. Examples of suitable organic polycyclic pigments include phthalocyanine, quinacridone, perylene, perinone, thioindigo, anthraquinone, dioxazine, isoindolinone, isoindoline, diketo-pyrrolo-pyrrole (DPP), triarylcarbonium, quinophthalone, and combinations thereof. Examples of suitable dyes include those known by a common name such as alizarin (turkey red), crystal violet, methyl red, rose bengal, titan yellow, purpurin, and combinations thereof.

Inorganic materials that may be suitable for use as a coloring agent include pigments commercially available under the trade designations STAPA METALLUX 212 (aluminum paste) or PHOENIX PX5310 (pearlescent) (both available from Eckart America Corp., located in Louisville, KY) and BLACK OLIVE 9000Z or MEARLIN Sparkle Bronze 9250J (both available from BASF, located in Ludwigshafen, Germany).

Examples of suitable pigments or dyes may include those classified by the Society of Dyers and Colourists on the COLOUR INDEX (CI) by a generic name and an identification number that summarizes its properties. In some examples, suitable pigments or dyes may be those that have been allocated a constitution number on the CI.

Optional Additives

The coating material may include other optional additives, including, e.g. curing agents, hardeners, surfactants, and combinations thereof. The coating material may include a fluoro functional chemical group, such as a fluoro functional silicon group.

Color Coating the Microparticles

The colored coating may be formed on the microparticles using any process suitable for applying the colored coating to the microparticles (e.g. on the outer surface of the microparticles). A process for applying the colored coating may include any process that forms the colored coating as a uniformly distributed layer on the microparticles.

In some embodiments, the colored coating may be applied to the microparticles using a single processing step. In some embodiments, the colored coating may be applied to the microparticles using a process that includes multiple steps.

In some embodiments, the colored mixture may be formed on the microparticles such that the colored coating defines a single layer. For example, the coloring agent may be combined with the coating material to form a colored mixture. The colored mixture may then be applied to the microparticles using any suitable process that positions the colored mixture as a coating of a suitable thickness on the outer surface of the microparticles, including, e.g., mixing the microparticles with the colored mixture such that the outer surfaces of the microparticles are contacted by the colored mixture. In some embodiments, the colored mixture may be applied to the microparticles by extruding the colored mixture onto the outer surface of the microparticles.

In some embodiments, the colored coating may be applied to the microparticles in multiple layers. For example, the colored component may be applied to the outer surface of the microparticles to form a first layer. The coating material may be applied to form a second layer on the colored component such that the colored component is adhered or bonded to the microparticles with the coating material.

Other examples of coating processes include solvent coating (e.g., applying the colored mixture with a solvent based carrier that evaporates after the coating mixture is applied), spray coating (e.g., spraying the coating mixture in a finely divided state, with or without a carrier solvent, onto the microparticles), and combinations thereof.

The coating process may include processing steps to harden the colored coating, e.g., after the colored mixture has been applied to the microparticles. The coating mixture may undergo any suitable steps such that the coating material hardens on the microparticles, such as curing or drying. The coating material may be dried (e.g., held for a time under suitable a temperature and humidity level) to form a hardened colored coating. The coating process may include a drying step (e.g., spray drying).

In some embodiments, the coating material can be hardened under ambient conditions (e.g., room temperature) for example, if the coating material includes a thermoset. In some embodiments, the coating mixture may be heated after being applied to the microparticles such that the coating material hardens, including reacting, curing, drying, or combinations thereof.

In some embodiments, the microparticles and the coating mixture may be further processed to inhibit the colored coating from joining the microparticles together after hardening. For example, the microparticles and colored mixture may be agitated (e.g., mixed, shaken, stirred, sifted) while the coating material is curing or drying.

In some embodiments, the coating process provides a colored coating having a coat weight from about 20 μm, about 30 μm, about 40 μm, to about 50 μm, about 60 μm, about 70 μm, or about 80 μm, or a thickness between any pair of the foregoing values. The coat weight or coating thickness is the thickness of the coating disposed on the outer surface of a microparticle. The coat weight is defined as the difference between the outer surface of the microparticle which is in contact with the coating and the outer surface of the coating as measured in the radial direction from the center of the microparticle. The coat weight is the final thickness of the colored coating after the coating material has hardened, such as by curing or drying. The coat weight may be the total thickness of the coating material in combination with the coloring agent. In some embodiments, such as if the coloring agent and coating material are applied to the microparticles in layers, the coat weight is the final combined thickness of all layers that have been applied to the outer surface of the microparticles.

The coat weight may be measured using a particle size analyzer before and after the coating process to measure the thickness of the colored coating. The coating thickness may be measured as the difference between the size of the microparticles before and after the colored coating has been applied and hardened. A particle size analysis may be carried out using a scanning electron microscope (SEM).

In some embodiments, the weight percent of the colored coating on the microparticles is from about 0.1, about 0.5, about 1, about 5, or about 10 to about 20, about 30 percent, about 40, or about 50 percent of the weight of the microparticle, or a weight percent between any pair of the foregoing values.

In some embodiments, the low density colored component has a density of about 0.1 g/cc, about 0.2 g/cc, about 0.5 g/cc, or about 1.0 g/cc to about, 1.5 g/cc, about 2.0 g/cc, about 2.5 g/cc, or a density between any pair of the foregoing values. Particularly useful embodiments of the low density colored component include those having a density less than 2.6 g/cc, no greater than 2.0 g/cc, or even no greater than 1.0 g/cc.

Forming a Low Density Colored Composition

In some embodiments, the low density colored component is suitable for use in a low density colored composition. For example, the low density colored component may be useful as a filler that is combined with a base component to form a colored composition suitable for a variety of functions including e.g. a binder, a filler, a sealant, or a grout.

The colored composition can be formulated to be suitable for a variety of applications including, a binder (e.g., for holding construction materials together, such as binding tiles to a substrate, a filler (e.g., filling spaces between construction material, such as tiles) a sealer (e.g., sealing gaps between construction materials, e.g., a water proof sealer), for use in patches and putties (e.g., for bathroom surfaces or marine applications), caulks, flooring materials, and combinations thereof.

The low density colored composition includes a base component and a colorized filler.

The Base Component

The base component may be any substance that can be in liquid or semi-liquid form (such as a paste), and that can cure, dry, polymerize, crosslink, or react to form a solid material. Useful examples of the base component include substances that are liquid before being associated with the colorized filler. Suitable examples of the base component include substances that can be combined with the colorized filler to form a colored composition that can be applied in a workable form, such as a liquid, paste, or putty before the colored composition has hardened. The base component may be any composition that can be combined with the colorized filler to form any of a joint filler, caulk, or a grout.

In some embodiments, the base component can be fully transparent or partially transparent. That is, the base component may have a level of transparency from fully transparent to any degree of transparency such that a colorized filler embedded within the base component can be seen. In some embodiments, the base component can be opaque.

The base component includes a resin system. The resin system may include a monomer that contains reactive groups that can react to form a polymer. The resin system may be a polymerizable organic compound, e.g., a polymer, a pre-polymer, an oligomer, a crosslinkable monomer, a polymerizable monomer, and combinations thereof. Useful classes of resin systems include reactive compositions, thermoplastic compositions, thermoset compositions, polymeric binders (e.g., acrylic emulsions), reactive binders, and combinations thereof. The base component may include a pre-polymer, a polymer component, and combinations thereof. Useful examples of polymers suitable for use in the resin system include, e.g., urethanes, polyacrylates, thermoplastic polymers, thermoset polymers, and combinations thereof. The resin system can be in a variety of forms including, e.g., emulsion, suspension, dispersion, and solution.

Examples of suitable thermoset resin systems include epoxies (e.g., two-part epoxies), urethanes (e.g., one-part urethanes or two-part urethanes), and combinations thereof. One example of a suitable urethane is a one-part moisture cure urethane.

Other resin systems include, for example, elastomers such as polyurea, (e.g an aliphatic polyurea such as polyaspartic), silicone, silane terminated polymer (e.g., a silane terminated urethane), and combinations thereof.

The resin system optionally includes a solvent. Suitable solvents include, e.g., water, volatile organic solvents (e.g., alcohols (e.g. ethanol, methanol, isopropanol, and combinations thereof), ester alcohol, and combinations thereof.

The Colorized Filler

In some embodiments, the low density colored component is suitable for use as the colorized filler.

Optional Additives

The colored composition optionally includes a variety of other additives including, e.g., open time extenders, diluents, adhesion promoters, hydrophobic additives, co-solvents, freeze additives, biocides, non-polymeric fillers, defoamers, thickeners, surfactants (e.g., nonionic, cationic and anionic surfactants), extenders, preservatives, plasticizers, silane coupling agents, alkyl polysilicates, stain resistant additives, UV stabilizers, and combinations thereof.

Useful thickeners include, e.g., cellulose ether, xanthan gum, gum arabic, guar gum, protein derived polymers, starches and casein derived polymers, ethers, hydroxymethyl cellulose, hydroxyethyl cellulose, fibers, fumed silica, alkali swellable thickeners, and combinations thereof.

Useful stain resistant additives include, e.g., wax emulsions, wax particles, fluoro-carbon based particles and emulsions, silicone-based particles and emulsions, hydrophobes (e.g., oleates and stearates) and combinations thereof.

Useful biocides include those commercially available under the trade name ACTICIDE (available from Thor Specialties, Inc., located in Shelton, CT). The optional biocide may be present in the composition in an amount of from greater than 0% by weight to about 0.02% by weight.

The base component and the colorized filler are combined to form the low density colored composition. For example, the low density colored composition is formed by combining the colored composition, the base composition, and optionally any of the optional additives, such that the colored composition is dispersed throughout the base composition.

In general, any suitable method for combining the colored composition and the base composition such that the colored composition imparts coloration to the composition, and that the low density colored composition is a liquid or paste can be used. For example, the base composition can be a liquid and the colored composition can be colored plastic beads that are then physically mixed to form a liquid low density colored composition. The low density colored composition can be prepared such that the colorized filler is present in an amount from 10 percent, about 20 percent, about 30 percent, to about 40 percent, about 50 percent, or about 70 percent by weight of the colored composition, or a weight percent between any pair of the foregoing values.

In some embodiments, the density of the colored composition exhibits a density less than 1.8 kg per liter (about 15.0 lbs per gallon). For example, the density of the colored composition may be from greater than 0.0 kg per liter, from about 0.6 kg per liter (about 5 lbs per gallon), about 0.9 kg per liter (about 7.5 lbs per gallon), about 1.0 kg per liter (about 8.3 lbs per gallon), about 1.1 kg per liter (about 9.2 lbs per gallon), about 1.2 kg per liter (about 10 lbs per gallon), or about 1.3 kg per liter (about 10.8 lbs per gallon), to about 1.4 kg per liter (about 11.7 lbs per gallon), about 1.5 kg per liter (about 12.5 lbs per gallon), or about 1.6 kg per liter (about 13.4 lbs per gallon), or a density between any pair of the foregoing values. In a particularly useful embodiment, the density of the colored composition is less than 1.5 kg per liter (about 12.5 lbs per gallon).

The low density colored composition can be formulated in a variety of forms, including e.g. a liquid, a putty, or paste, that is suitable for application into small spaces. In some embodiments, the low density colored composition is a premixed-composition, ready to apply, and free flowing. The low density colored composition is suitable for a variety of functions including e.g. a binder, a filler, a sealant, a grout. For example, the low density colored composition may be useful as a binder for holding construction material together. The low density colored composition may be useful for binding tiles to a surface, such as to the surface of the walls or a floor of a building. The low density colored composition may be suitable for filling spaces between construction material. The low density colored composition may be useful for filling spaces between construction materials (e.g. tiles) applied to walls or a floor of a building. The low density colored composition may be suitable for sealing gaps between construction materials (e.g. bricks, cinderblocks, or tiles). The low density colored composition may be useful for sealing a gap defined between adjacent tiles such that water is inhibited from entering the gap (e.g. water proof sealant).

The low density colored composition may be useful for use in patches and putties, for example water proof putties for bathroom surfaces or marine applications (e.g. a waterproof filler, an air tight filler, or sealant). The low density colored composition may be useful for use in flooring materials, such as a floor lining. The low density colored composition may be a non-cementitious grout composition, such as a one-part grout.

The compositions disclosed herein provide a low density filler material, suitable for use as a filler, such as in a low density grout composition. Grout compositions are often packaged and provided to an end user as a premade, one-part composition, and the volume of the composition is typically a set value. As a result, a low density composition that occupies the same volume will be lighter and can help make transportation and storage less costly and can help make the composition easier to apply.

The colorized filler described herein can be used to form a grout that can be formulated such that the grout can be minimally or free of abrasion when the grout composition is wiped across the face of construction material such as tiles. It has been found that using a filler material that is rounded or free of sharp edges and corners, for example microparticles, a user can wipe the colored composition against the substrate (e.g., when cleaning up the colored composition) without abrading the surface of the substrate. Microparticles have been found to be suitable as a filler material and exhibit minimal abrasion or may be abrasion free when wiped along certain substrates such as tiles. Using the colorized filler disclosed herein to form a colored composition, a user can apply the composition to tiles, and the excess colored composition can be wiped off without scratching the face of the tiles.

The compositions disclosed herein exhibit good color consistency and easy clean up after being applied. It has been found that in some instances if a coloring agent is bound to a filler, the coloring agent can be inhibited from bleeding out of the base component because the coloring agent is bound to the filler material. Because the filler material is general present in particle sizes that inhibit it from moving out of the base component, and because the coloring agent is bound to the filler material, the compositions disclosed herein help provide various options for sealants, fillers, and binders that have good color distribution and uniformity throughout the composition even after being applied. Because the coloring agent is inhibited from bleeding out of the low density colored composition, the compositions disclosed herein avoid the need for additional cleaning materials to be used when removing excess composition from construction materials

EXAMPLES

The following non-limiting examples are included to further illustrate various embodiments of the instant disclosure and do not limit the scope of the instant disclosure.
Test Methods:
Sag Test Method A ¼ inch tile joint between two six-inch porcelain tiles is formed, with the tiles positioned along a vertical substrate. The composition to be tested is positioned in the tile joint and then allowed to set for 12 hours minimum. The composition to be tested is observed for 24 hours and a visual inspection is noted. A composition is assigned a rating of "pass" if it maintains a flat surface along the tile joint without sagging or bowing.
Viscosity Test Method The viscosity is measured with a Brookfield HB viscometer (from AMETEK Brookfield of Middleboro, Massachusetts), using a T-C type T-bar spindle at five rpm and at a temperature of 21° C. (70° F.).

Abrasion Test Method

Metallic tiles each having a stainless steel face measuring two inches (five cm) by six inches (15 cm) are affixed to a rigid substrate such that a linear gap exists between each of the tiles. The composition to be tested is then applied into the linear gap and across the face of each tile using a grout float. The face of each tile is then wiped off with a wet sponge to remove any composition. The composition is then allowed to harden. The tiles are then photographed. The presence of scratches is noted using a visual inspection with the naked eye. The surface of the tile is identified as "substantially free" of scratches if the face of each tile has no more than two scratches per tile.

Scanning Electron Microscope Photograph Procedure

A suitably sized section is taken from each sample and placed on carbon tape. The sample surfaces are coated with a thin layer of gold to promote surface conductivity and control surface charging. Scanning electron microscope (SEM) photomicrographs are taken of each sample surface at instrument settings of 50× magnification.

First Resin System Comparison

The First resin system of the First Control and Examples 1 to 3 was prepared using the following components: a first acrylic polymer emulsion (from Gellner Industrial, LLC of Tamaqua, PA), a second acrylic polymer emulsion (from H. B. Fuller of St. Paul, MN), wetting agent (open time extender) (from Solvay, of Princeton, NJ), water (diluent), ethyl silicate (open time extender) (from Royal Sil Inc., of Mount Laurel, NJ), zinc stearate (hydrophobic additive) (from American eChem, Inc, of Lufkin, TX), biocide (from Thor Specialties, Inc., of Shelton, CT), ester alcohol (co-solvent) (from Eastman Chemical Company, of Kingsport, TN), polyethylene glycol (freeze additive) (from PCC Chemax Inc., of Piedmont, SC), hydroxyethylcellulose, (non-ionic water-soluble cellulose thickener) (from Ashland LLC, of Covington, KY), surfactant (dispersing agent) (from BYK-Chemie GmbH, of Wesel, Germany), fluorosurfactant (hydrophobic water dispersion additive) (from The Chemours Company, of Wilmington, DE), rheology additive (thickener) (from BYK-Chemie GmbH, of Wesel, Germany), biocide (from Thor Specialties, Inc., of Shelton, CT), and wollastonite microfiber (filler) (from Nexeo Solutions, of The Woodlands, TX). The amount of each component is set forth in Table 1.

To make the grout composition, the following process was used. Adding the first and second polymer emulsions and water to a mixing vessel with mixing. As the mixing continued, the following components were added in the following order: open time extender, water, adhesion promoter, hydrophobic additive, biocide, co-solvent, and the freeze additive. As the mixing continued, a mixture of water and the cellulose thickener was then added to the mixture.

Then the following components in the following order were added to the mixture: surfactant, fluorosurfactant, thixotropic thickener, biocide (fungicide), wollastonite microfiber, and the filler component. Mixing continued for fifteen minutes after all the components had been added.

First Control:

The First Control composition was formed with the resin composition set forth in Table 1 and described above, and included PERMACOLOR HP FINE WHITE coated sand (Clifford W. Estes Company, of Ottawa, IL), which had a density of 2.65 g/cc.

First Comparative Examples

Examples 1 to 3 were prepared according to the process disclosed above using the components in the amounts set forth in Table 1 with the exception that the filler component in Examples 1 to 3 was colored polymer aggregate available under the trade designation ResNSand (The R.J. Marshall Company, of Southfield, MI). The Examples were prepared with the colored polymer aggregate having the product designations as follows: Example 1: ULTRA 60; Example 2: ULTRA 100; and Example 3: ULTRA 200C.

TABLE 1

First Example Colored Compositions

| Base Component (First resin system) | First Control (Sand) | | Example 1 (Ultra 60) | | Example 2 (Ultra 100) | | Example 3 (Ultra 200C) | |
|---|---|---|---|---|---|---|---|---|
| | Wt. % | Wt (grams) | Wt. % | Wt (grams) | Wt. % | Wt (grams) | Wt. % | Wt (grams) |
| First acrylic polymer emulsion | 4.00 | 40.0 | 9.48 | 40.00 | 9.48 | 40.0 | 9.48 | 40.0 |
| Second acrylic polymer emulsion | 16.0 | 160.0 | 37.9 | 160 | 37.91 | 160.0 | 37.9 | 160.0 |
| Wetting agent | 0.10 | 1.0 | 0.24 | 1.0 | 0.24 | 1.00 | 0.24 | 1.0 |
| Diluent | 0.61 | 6.1 | 1.45 | 6.1 | 1.45 | 6.10 | 1.45 | 6.1 |
| Ethyl silicate | 0.30 | 3.0 | 0.71 | 3.0 | 0.71 | 3.00 | 0.71 | 3.00 |
| Zinc stearate | 0.48 | 4.8 | 1.14 | 4.8 | 1.14 | 4.80 | 1.14 | 4.80 |
| Biocide (antimicrobial) | 0.10 | 1.0 | 0.24 | 1.0 | 0.24 | 1.00 | 0.24 | 1.00 |
| Ester alcohol | 0.80 | 8.0 | 1.90 | 8.0 | 1.90 | 8.00 | 1.90 | 8.00 |
| Polyethylene glycol | 0.30 | 3.0 | 0.71 | 3.0 | 0.71 | 3.00 | 0.71 | 3.00 |
| Diluent | 0.79 | 7.9 | 1.87 | 7.9 | 1.87 | 7.90 | 1.87 | 7.90 |
| Hydroxyethylcellulose | 0.028 | 0.28 | 0.07 | 0.28 | 0.07 | 0.28 | 0.07 | 0.28 |
| Surfactant | 0.05 | 0.50 | 0.12 | 0.50 | 0.12 | 0.50 | 0.12 | 0.50 |
| Fluorosurfactant | 0.03 | 0.30 | 0.07 | 0.30 | 0.07 | 0.30 | 0.07 | 0.30 |
| Thixotropic thickener | 0.10 | 1.00 | 0.24 | 1.00 | 0.24 | 1.00 | 0.24 | 1.00 |
| Biocide (fungicide) | 0.02 | 0.20 | 0.05 | 0.20 | 0.05 | 0.20 | 0.05 | 0.20 |
| Wollastonite microfiber | 1.00 | 10.0 | 2.37 | 10.0 | 2.37 | 10.0 | 2.37 | 10.0 |

TABLE 1-continued

First Example Colored Compositions

| Base Component (First resin system) | First Control (Sand) | | Example 1 (Ultra 60) | | Example 2 (Ultra 100) | | Example 3 (Ultra 200C) | |
|---|---|---|---|---|---|---|---|---|
| | Wt. % | Wt (grams) | Wt. % | Wt (grams) | Wt. % | Wt (grams) | Wt. % | Wt (grams) |
| Filler Component | | | | | | | | |
| Coated sand (Permacolor HP BC Fine White) | 75.29 | 752.9 | | | | | | |
| ResNSand Ultra 60 | | | 41.5 | 175 | | | | |
| ResNSand Ultra 100 | | | | | 41.5 | 175 | | |
| ResNSand Ultra 200C | | | | | | | 41.5 | 175 |
| Viscosity (HBT/TC/5) | | 22 | | 20 | | 25 | | 27 |
| 24 Hr Viscosity (HBT/TC/5) | | 50 | | 39 | | 39 | | 43 |
| Density: lbs/gal | | 15.31 (1.83 kg/L) | | 9.38 (1.12 kg/L) | | 9.14 (1.10 kg/L) | | 9.31 (1.12 kg/L) |

FIG. 1 shows TEC SKILL SET, a commercially available premixed grout (H.B. Fuller Construction Products Inc., of St. Paul, MN) that includes sand as a filler and also contains a pigment directly added to the grout composition. The grout composition was applied to the quarry tiles positioned on the left side of the figure. FIG. 1 also shows the First Control composition positioned between the quarry tiles positioned on the right side of the figure.

To form the tile array shown in FIG. 1, a two ft. by three ft. tile board was made using quarry tiles of four inches by eight inches with a 0.25 in. grout joint between adjacent tiles. The grout composition that contains a pigment directly added (TEC SKILL SET) was applied diagonally into half the tile joints of half of the tiles on the tile board by holding the tile float at a 45-degree angle. The joints were visually inspected to ensure the joints were filled. After the grout was applied, the tile float was passed along the surface of the tiles while held at a 90-degree angle to strike off the excess grout. The First Control composition was positioned in the tile joints along the remaining half of the tile board using the same process. The resulting tile board is shown in FIG. 1, with the tile surfaces not wiped.

Figure 3:
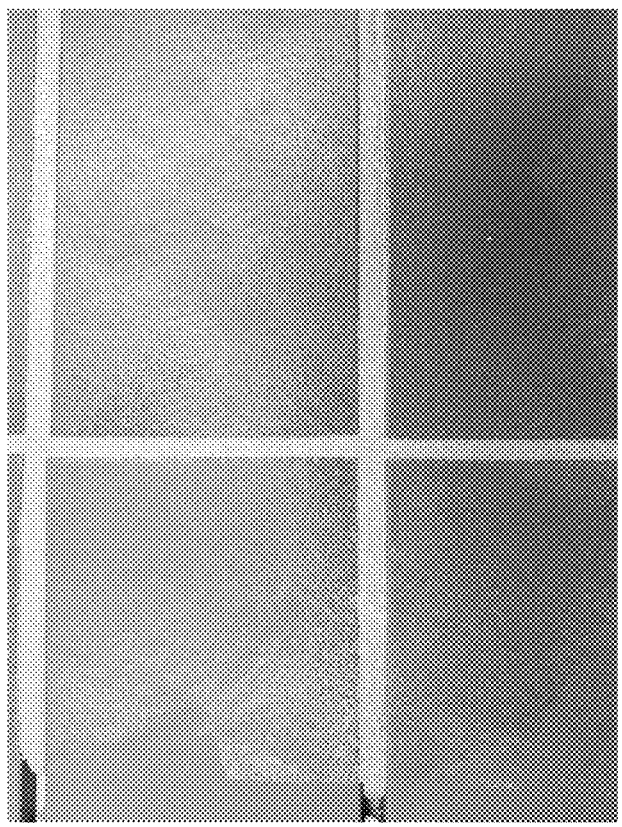
FIG. 3 is a photograph showing an enlarged view of the tile array with grout composition containing colored sand shown in FIG. 1.
Figure 2:
FIG. 2 is a photograph showing an enlarged view of the tile array with pigmented grout composition shown in FIG. 1.

FIG. 2 shows a close up view of the left side portion of the tile board shown in FIG. 1 that contains the commercially available premixed grout composition. FIG. 3 shows a close up view of the right side portion of the tile board shown in FIG. 1 that contains the First Control composition. As shown in FIG. 1, after a grout composition with pigment directly added to the grout composition was applied to the tiles, a grout haze is visible on the face of the tiles. The tiles having First Control composition applied have minimal amount of grout haze on the face of the tiles. The tiles shown in the photographs of FIGS. 1 to 3 had not had the surfaces of the tiles wiped when the photograph was taken.

Examples 4 and 5, were prepared with a similar process to Examples 1 to 3, with the following exceptions: BYK-044, a silicone emulsion (defoamer) (from BYK-Chemie GmbH, of Wiesel Germany) was included, and the filler component was black and grey colored plastic particles (Densified Color Granules, from The R.J. Marshall Company of Southfield, MI), respectively. The density of the colored plastic particles used as the filler component in Examples 4 and 5 was 1.7 g/cc. The compositions and amount of each ingredient, and density of the Examples 4 and 5 colored compositions are set forth in Table 2.

Figure 4B:
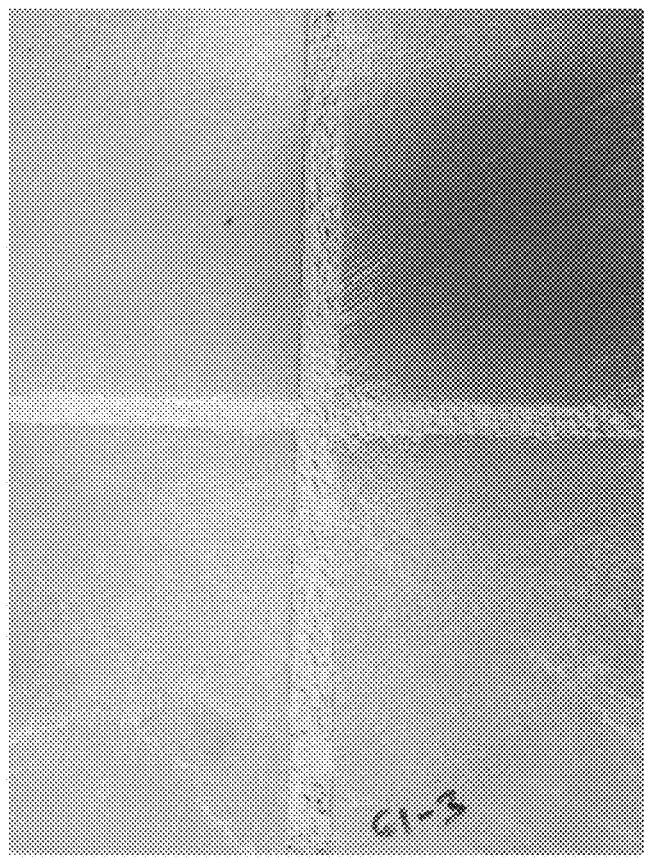
FIG. 4B is an enlarged view of the photograph of FIG. 4A, showing a colored composition positioned between the tiles, in accordance with some embodiments.
Figure 4A:
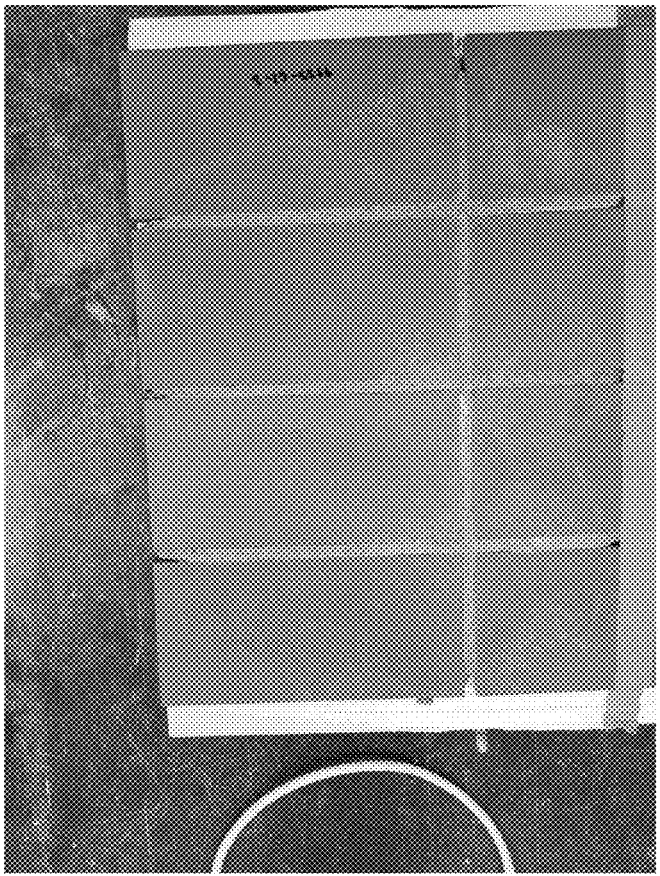
FIG. 4A is a photograph of a tile array with a colored composition positioned between the tiles, in accordance with some embodiments.

FIG. 4A shows the Example 5 grout composition positioned in the grout joints between quarry tiles. FIG. 4B is a close up view of the quarry tiles with Example 5 colored composition shown in FIG. 4B.

Figure 6:
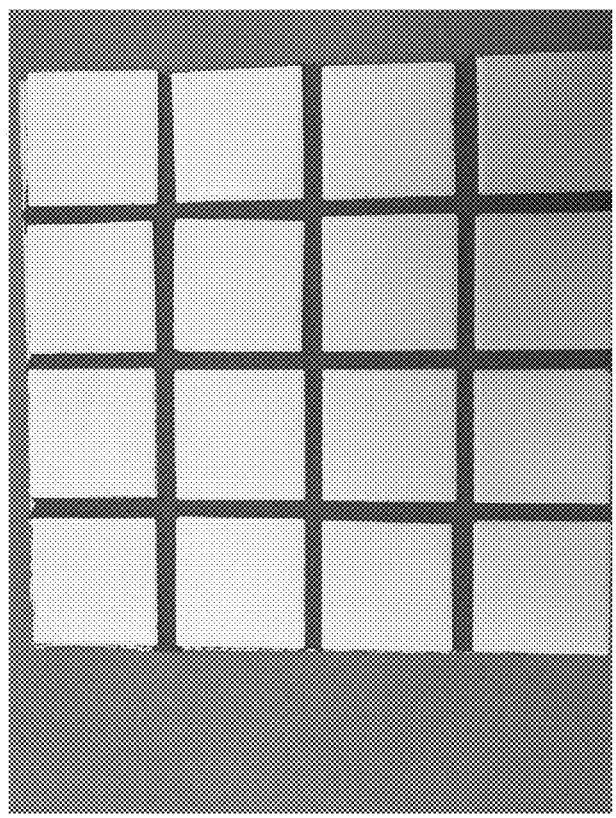
FIG. 6 is a photograph of a tile array with a colored composition, in accordance with some embodiments.
Figure 5:
FIG. 5 is a photograph of a tile array with a colored composition, in accordance with some embodiments.

FIGS. 5 and 6 shows the Example 4 and 5 grout composition, respectively, positioned in the grout joints between porcelain tiles.

As shown in FIGS. 4A to 6, when using a colored composition such as those disclosed herein, a minimal amount of grout haze remains on the tile faces after the colored composition is applied.

TABLE 2

First Example Colored Compositions

| | Example 4 (DC Granules (black)) | | Example 5 (DC Granules (grey)) | |
|---|---|---|---|---|
| | wt. % | Wt (grams) | wt. % | Wt (grams) |
| First acrylic polymer emulsion | 7.42% | 39.77 | 7.40% | 74.00 |
| Second acrylic polymer emulsion | 24.89% | 133.32 | 24.91% | 249.10 |
| Wetting agent | 0.24% | 1.29 | 0.20% | 2.00 |
| Water | 1.68% | 9.01 | 2.50% | 20.00 |
| Ethyl silicate | 0.36% | 1.93 | 0.36% | 3.60 |
| Zinc stearate | 0.58% | 3.09 | 0.50% | 5.00 |
| Biocide (antimicrobial) | 0.12% | 0.64 | 0.10% | 1.00 |
| Ester alcohol | 0.96% | 5.15 | 0.95% | 9.50 |
| Polyethylene glycol | 0.36% | 1.93 | 0.35% | 3.50 |
| Hydroxyethylcellulose | 0.03% | 0.18 | 0.03% | 0.30 |
| Surfactant | 0.06% | 0.32 | 0.06% | 0.60 |
| Fluoro surfactant | 0.04% | 0.19 | 0.03% | 0.30 |
| Thixotropic thickener | 0.12% | 0.64 | 0.10% | 1.00 |
| Biocide (fungicide) | 0.02% | 0.13 | 0.02% | 0.24 |
| Wollastonite microfiber | 1.20% | 6.43 | 1.00% | 10.00 |
| Densified Color granules | 61.85% | 331.32 | 61.44% | 614.40 |
| Silicone emulsion | 0.06% | 0.32 | 0.05% | 0.50 |
| Total Composition Density | 11.1 lb/gal | 1.33 kg/L | 10.51 lb/gal | 1.26 kg/L |

Figure 7:
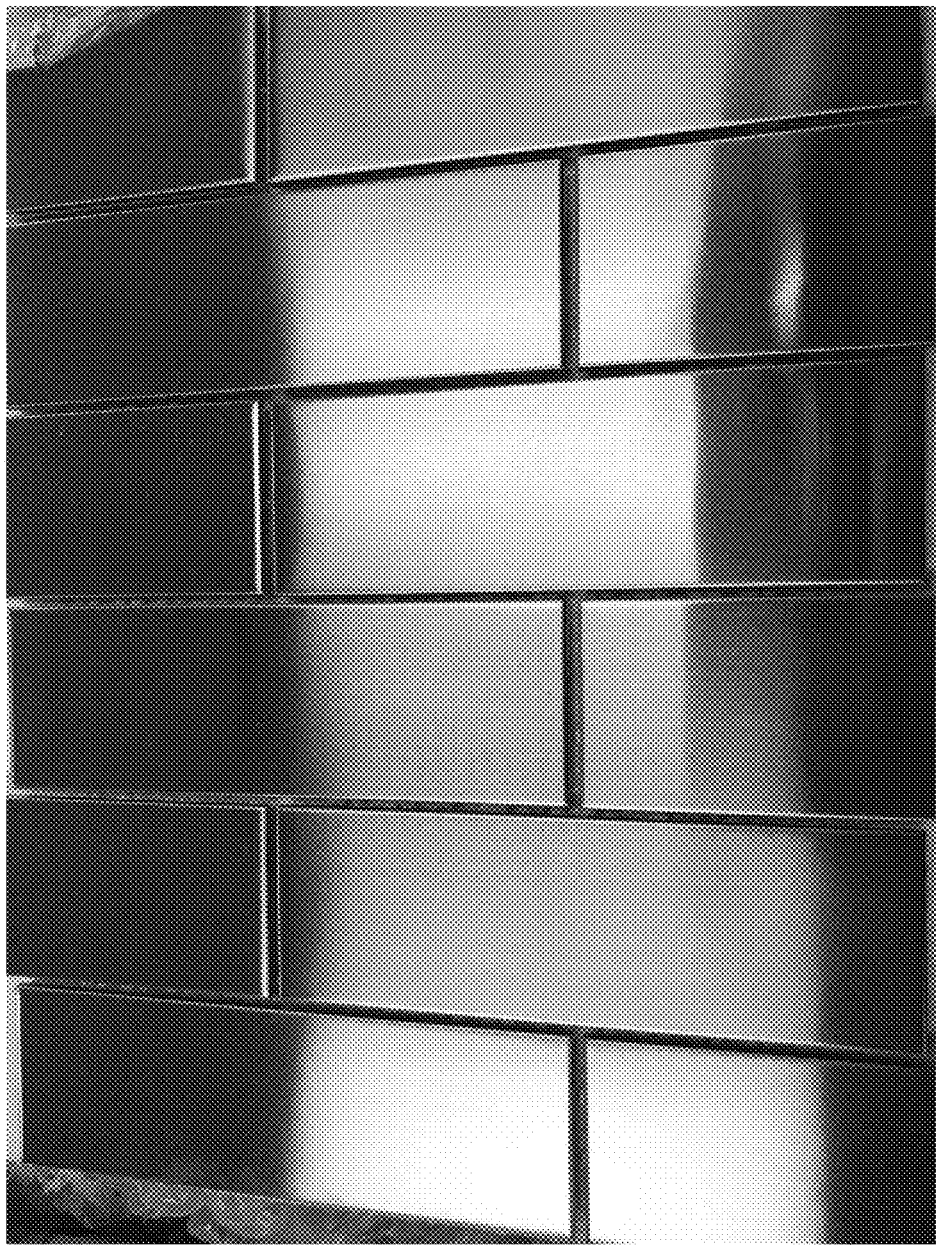
FIG. 7 shows a photograph of a tile array of metallic tiles.

FIG. 7 shows a tile array that was formed using two inches by six inches stainless steel metallic tiles (MONTAGE METROPOLITAN, from Floor and Decor of Smyrna GA). FIG. 7 shows the appearance of the tiles before a grout composition is applied.

Figure 8:
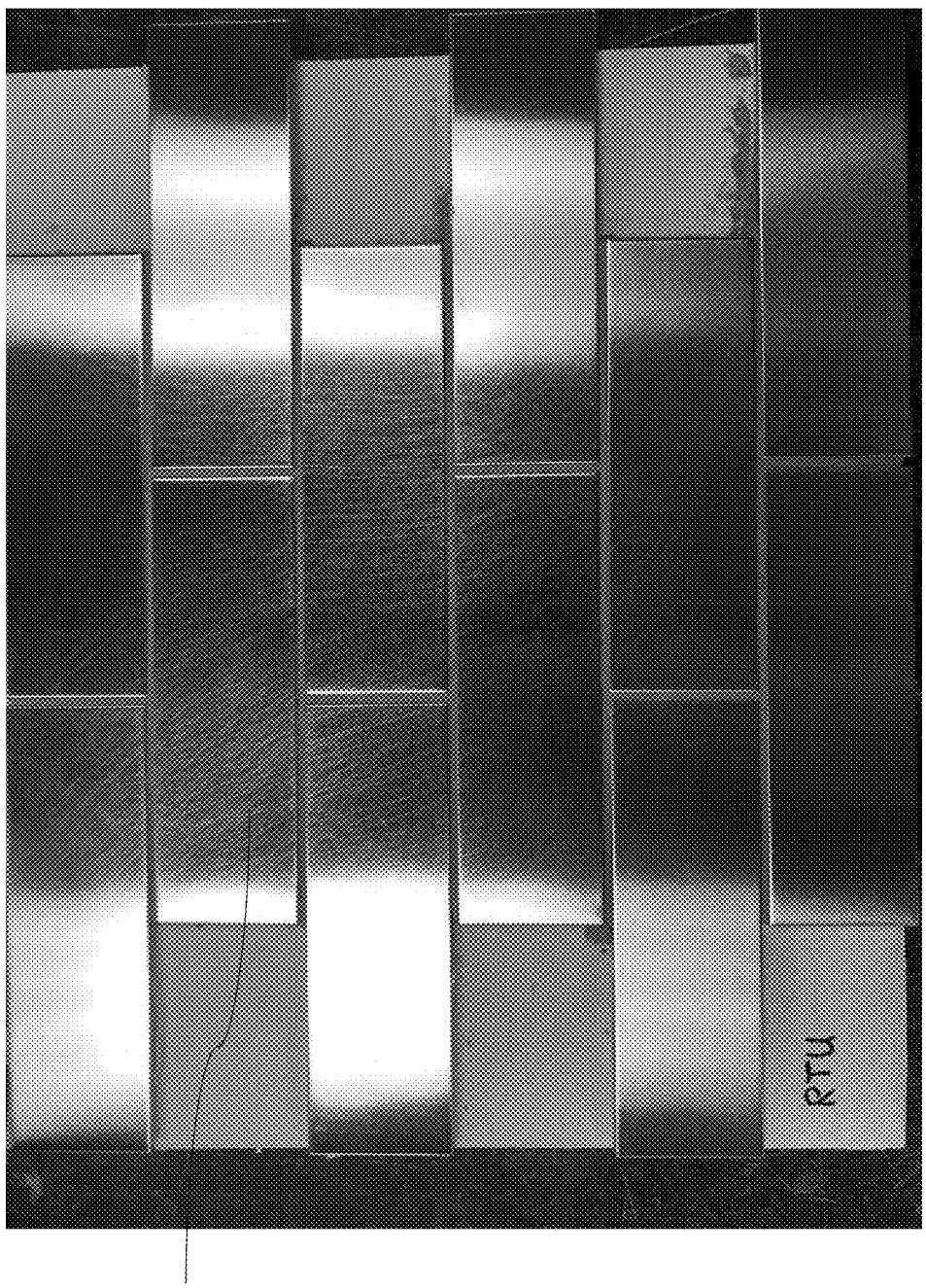
FIG. 8 shows a photograph of a tile array having the same kind of metallic tiles as shown in FIG. 7 with a grout composition positioned in the grout joints.

FIG. 8 shows a tile array having the same kind of metallic tiles as shown in FIG. 7. FIG. 8 shows the appearance of the tiles after a grout composition was applied. The same commercially available premixed grout as shown in FIG. 1 that includes sand as a filler and also contains a pigment directly added to the grout composition (TEC SKILL SET, from H.B. Fuller Construction Products Inc., of St. Paul, MN) was applied in the grout joint between the tiles. A wet sponge was used to wipe away the grout composition that remained on the face of the tiles. As shown in FIG. 8, the faces of the tiles have scratches 10 along the surfaces.

Figure 9:
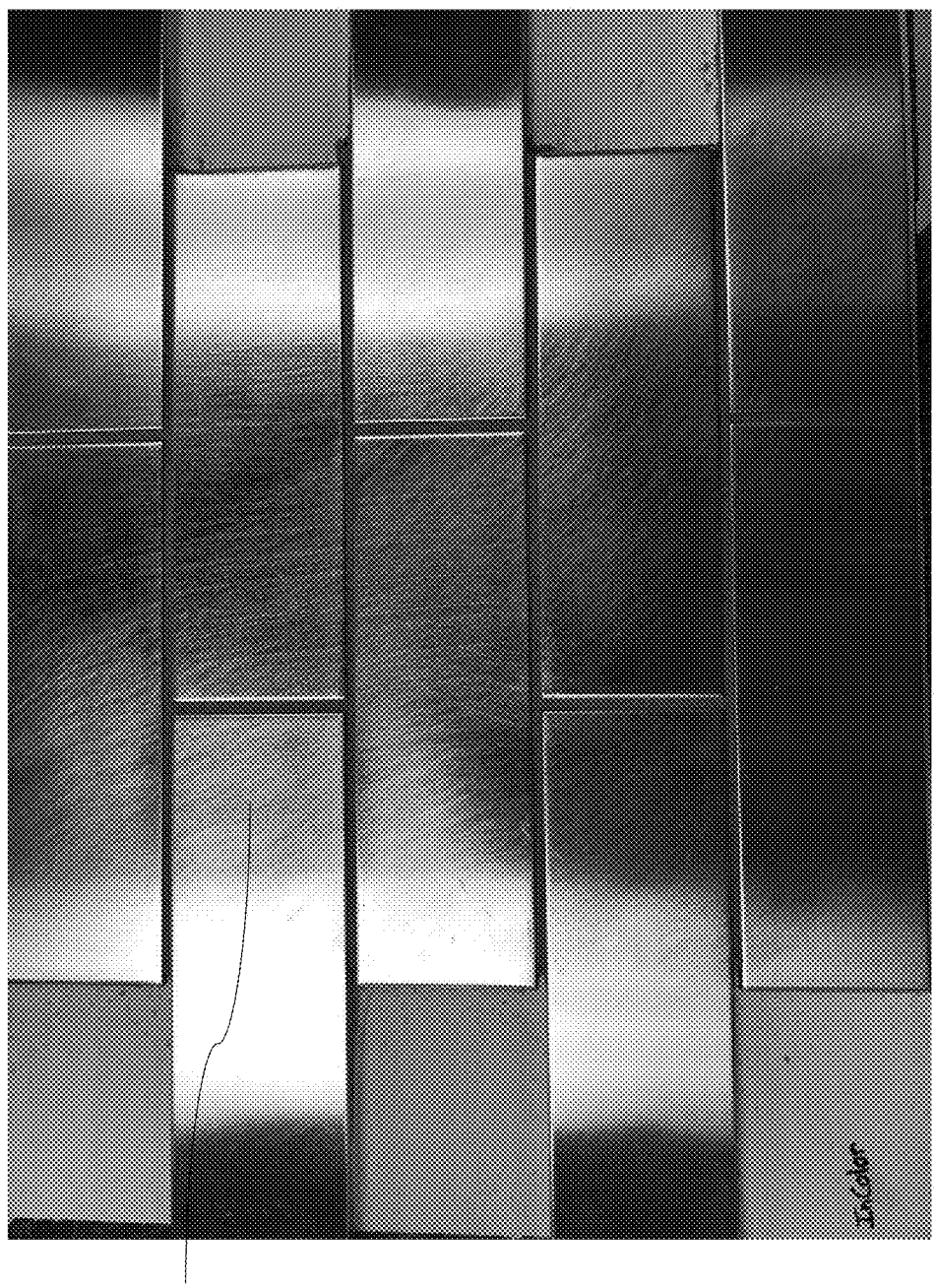
FIG. 9 shows a photograph of a tile array having the same kind of metallic tiles as shown in FIG. 7 with a grout composition positioned in the grout joints.

FIG. 9 shows a tile array having the same kind of metallic tiles as shown in FIG. 7. FIG. 9 shows the appearance of the tiles after the First Control composition set forth in Table 1 was applied. The First Control composition, which is the same composition shown in FIG. 3, was applied in the grout joint between the tiles. A wet sponge was used to wipe away the grout composition that remained on the face of the tiles. As shown in FIG. 9, the faces of the tiles have scratches 12 along the surfaces. It was observed that the scratches 12 were formed when the sand that was used as the filler component was rubbed across the faces of the tiles as the grout composition was wiped away.

Figure 10:
FIG. 10 shows a photograph of a tile array having the same kind of metallic tiles as shown in FIG. 7 with a colored composition positioned in the grout joints.

FIG. 10 shows a tile array having the same kind of metallic tiles as shown in FIGS. 7, 8, and 9. The colored composition shown in FIG. 10 is the same as that shown in FIG. 5. The Example 4 colored composition was applied in the grout joint between the tiles. A wet sponge was used to wipe away the colored composition that remained on the face of the tiles. FIG. 10 shows the appearance of the metallic tiles after the Example 4 colored composition was applied. As shown in FIG. 10, the faces of the tiles are free of scratches along the surfaces.

Figure 11:
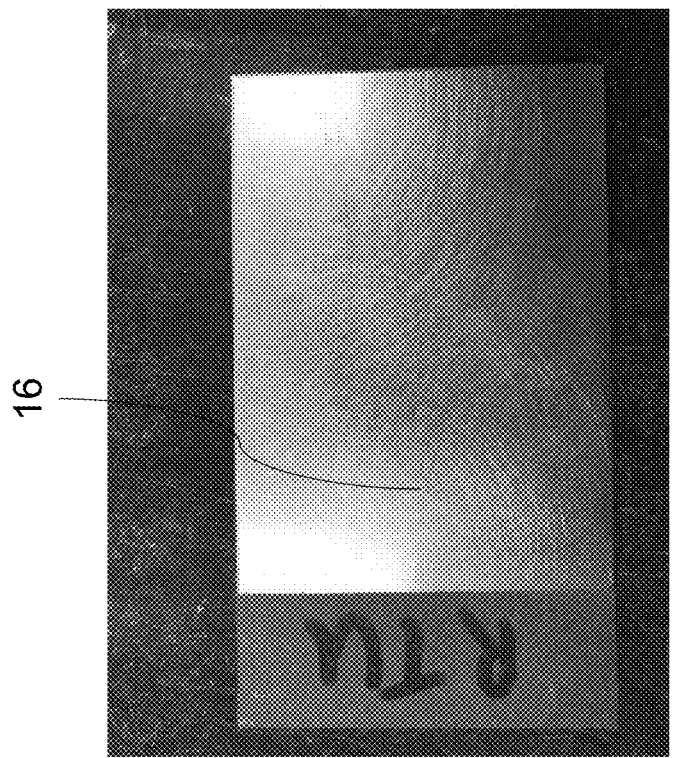
FIGS. 11 and 12 show photographs of metal plates after two different compositions were applied and then wiped from the surface of the plates.
Figure 12:
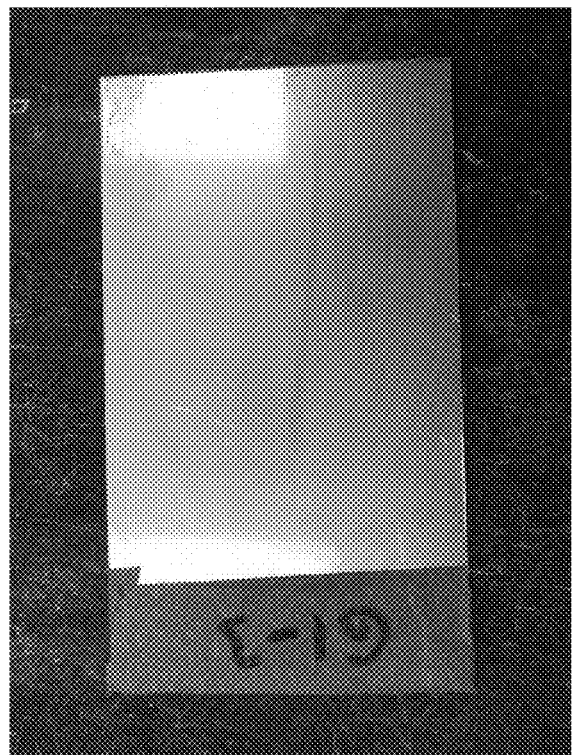

FIGS. 11 and 12 show metal plates that were had two different compositions applied and then wiped from the surface of the plates. FIG. 10 was prepared by applying the commercially available grout composition shown in FIG. 1 to the face of the metal plate. The grout composition (TEC SKILL SET) used to form FIG. 11 contains a pigment directly added to the composition and includes sand as a filler component. After a wet sponge was used to clean the face of the metal plate, scratches 16 were visible along the face of the metal plate. FIG. 12 shows a metal plate after the Example 4 colored composition set forth in Table 2 was applied to the face of the tile and then wiped away with a wet sponge. As shown in FIG. 12, after the Example 4 colored composition was wiped away, the metal plate was free of scratches along the surface.

Second Resin System Comparison

A Second resin system was prepared for the Second Control composition and for Examples 6 and 7 and included the following: a first acrylic polymer emulsion (from Gellner Industrial, LLC of Tamaqua, PA), a second acrylic polymer emulsion (from H.B. Fuller of St. Paul, MN), wetting agent (open time extender) (from Solvay, of Princeton, NJ), water (diluent), ethyl silicate (open time extender) (from Royal Sil Inc., of Mount Laurel, NJ), zinc stearate (hydrophobic additive) (from American eChem, Inc, of Lufkin, TX), biocide (from Thor Specialties, Inc., of Shelton, CT), ester alcohol (co-solvent) (from Eastman Chemical Company, of Kingsport, TN), polyethylene glycol (freeze additive) (from PCC Chemax Inc., of Piedmont, SC), hydroxyethylcellulose, (nonionic water-soluble cellulose thickener) (from Ashland LLC, of Covington, KY), surfactant (dispersing agent) (from BYK-Chemie GmbH, of Wesel, Germany), fluorosurfactant (hydrophobic water dispersion additive) (from The Chemours Company, of Wilmington, DE), rheology additive (thixotropic thickener) (from BYK-Chemie GmbH, of Wesel, Germany), biocide (fungicide) (from Thor Specialties, Inc., of Shelton, CT), and wollastonite microfiber (filler) (from Nexeo Solutions, of The Woodlands, TX).

The Second resin system was prepared by adding the above listed components with mixing in the following order: the two polymer emulsions and water were added to a mixing vessel while mixing. Mixing continued as the following components were then added in the following order: open time extender, water, adhesion promoter, hydrophobic additive, biocide, co-solvent, and freeze additive. As the mixing continued, a mixture of water and the cellulose thickener was then added to the mixture.

Then the following components in the following order were added to the mixture: surfactant, fluorosurfactant, thixotropic thickener, biocide (fungicide), and wollastonite microfiber. Mixing continued for fifteen minutes after all the components had been added.

Second Control

A Second Control composition was prepared as follows: the process disclosed above for preparing the resin system in the amounts set forth in Table 4 was carried out and PERMACOLOR HP FINE WHITE urethane coated sand (Clifford W. Estes Company, Inc., of Ottawa, IL) having a density of 2.65 g/cc was then added to the resin system with mixing. The coated sand was used as the filler component in the Second Control composition. The filler component was added to the resin system with mixing for at least fifteen minutes.

Example 6

The composition of Example 6 was prepared in a similar matter to the Second Control composition with the following exception: uncoated PORAVER X microspheres (PORAVER North America Inc., of Innisfil, Ontario, Canada) was mixed the resin system instead of the coated sand. The components were mixed in the amounts set forth in Table 4. The density of the uncoated PORAVER X microspheres was 0.95 g/cc.

Example 7

The composition of Example 7 was prepared in a similar matter to the Second Control composition with the following exception: coated PORAVER X microspheres (PORAVER North America Inc., of Innisfil, Ontario, Canada) was mixed the resin system instead of the coated sand. The components were mixed in the amounts set forth in Table 4. The density of the coated PORAVER X microspheres was 1.1 g/cc after undergoing the coating cycle twice.

Colored Microparticle Coating Process

Colored microparticles for the low density colored composition of Example 7 were prepared were prepared as follows. Adding one part EPON RESIN 862 liquid hypoxy resin (Miller-Stephenson, Inc., of Danbury CT), 0.02 parts GEMSPERSE KX series titanium white nonionic liquid pigment (Dominion Colour Corporation, of Toronto, Ontario, Canada), and 0.02 parts CHROMA-CHEM 844-7262 phthalo blue liquid pigment (ColorTrend USA, of Parsippany, NJ) and hand mixing with a spatula. As the mixing continued, 0.544 parts EPIKURE 3387 epoxy resin curing agent (Hexion Inc., of Columbus, OH) were added, and the mixture was hand mixed to form the coating mixture. The amounts of each component of the coating mixture are set forth in Table 3.

TABLE 3

Epoxy Coating Composition

| Component | Trade Designation | Part | Weight Percent |
|---|---|---|---|
| Liquid hypoxy resin (diglycidyl ether of bisphenol F) | EPON Resin 862 | 1 | 63.1 |
| Epoxy resin curing agent (cycloaliphatic amine) | EPIKUR 3387 | 0.54 | 34.3 |
| Nonionic liquid pigment (surfactant based) | GemSperse KX Series pigment | 0.02 | 1.3 |
| Phthalo blue liquid pigment | PB phthalo blue | 0.02 | 1.3 |

To coat the coating mixture on the microspheres, the following process was used. A sample of uncoated microspheres equal to 20 times the weight of the coating mixture was positioned in a mixing vessel. The coating mixture was slowly added to the sample of microspheres while mixing with a Cowles blade. This step provided an initial contact of the coating mixture on the microspheres. To further spread the coating mixture on the surface of the microspheres, the microspheres and coating mixture were added to a tumbler filled with steel balls and mixing continued to further spread the coating mixture over the surface of the microspheres and break up any clumps of microspheres as the coating mixture cured. Once the coating mixture had cured, the coated microspheres were sieved to remove any agglomerations or the coated microspheres. The steps of combining the coating mixture and the microspheres, mixing the microspheres and coating mixture with the steel balls, and sieving the coated microspheres in combination form one coating cycle. A complete coating process can include one or more coating cycles.

The microspheres of Example 7 were prepared with the coating cycle carried out twice on each sample to make a complete coating over the outer surfaces of the microspheres. After the coating process was carried out twice, the microspheres were visually inspected under a microscope.

Figure 13:
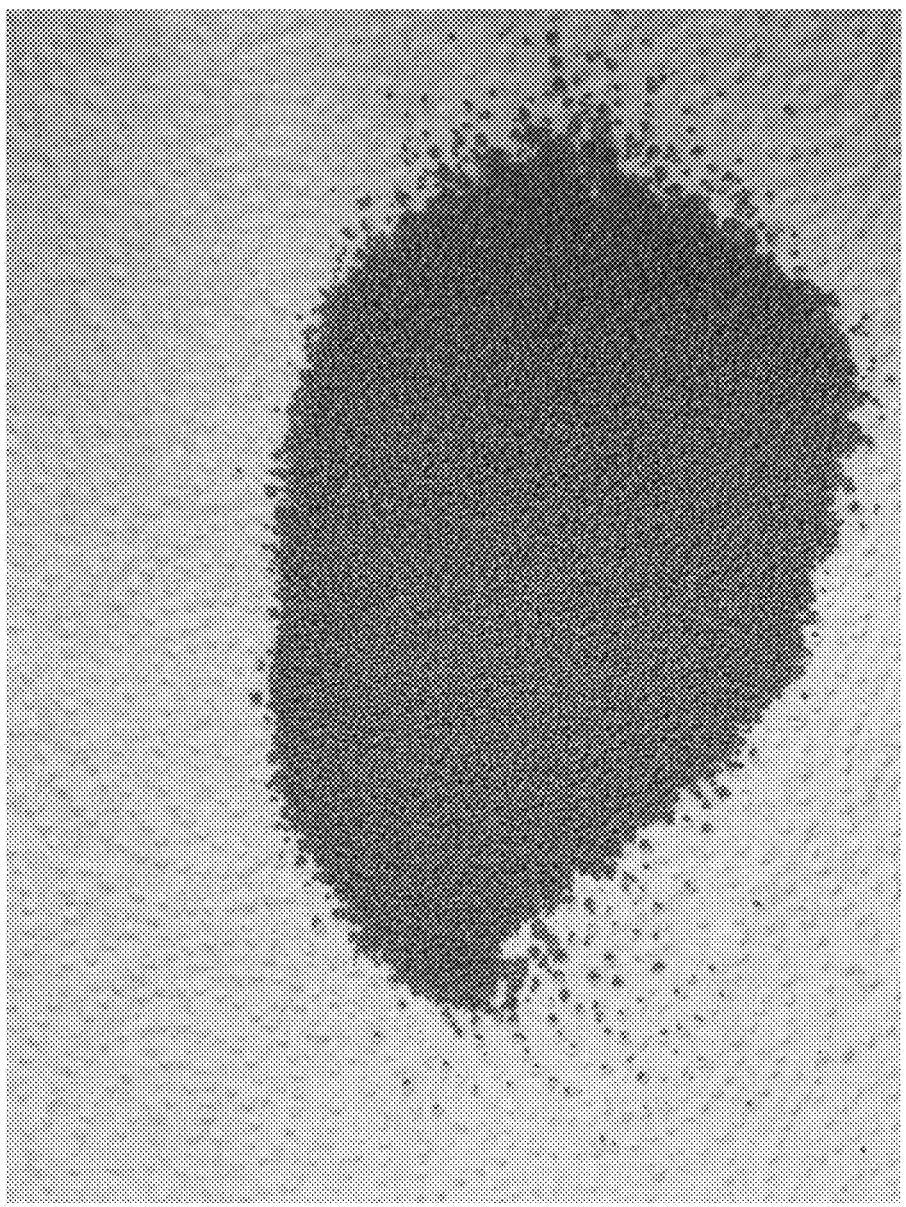
FIG. 13 is a photograph of coated microparticles, in accordance with some embodiments.

FIG. 13 is a photograph of the coated microspheres (coated Poraver X) of Example 7.

Figure 14:
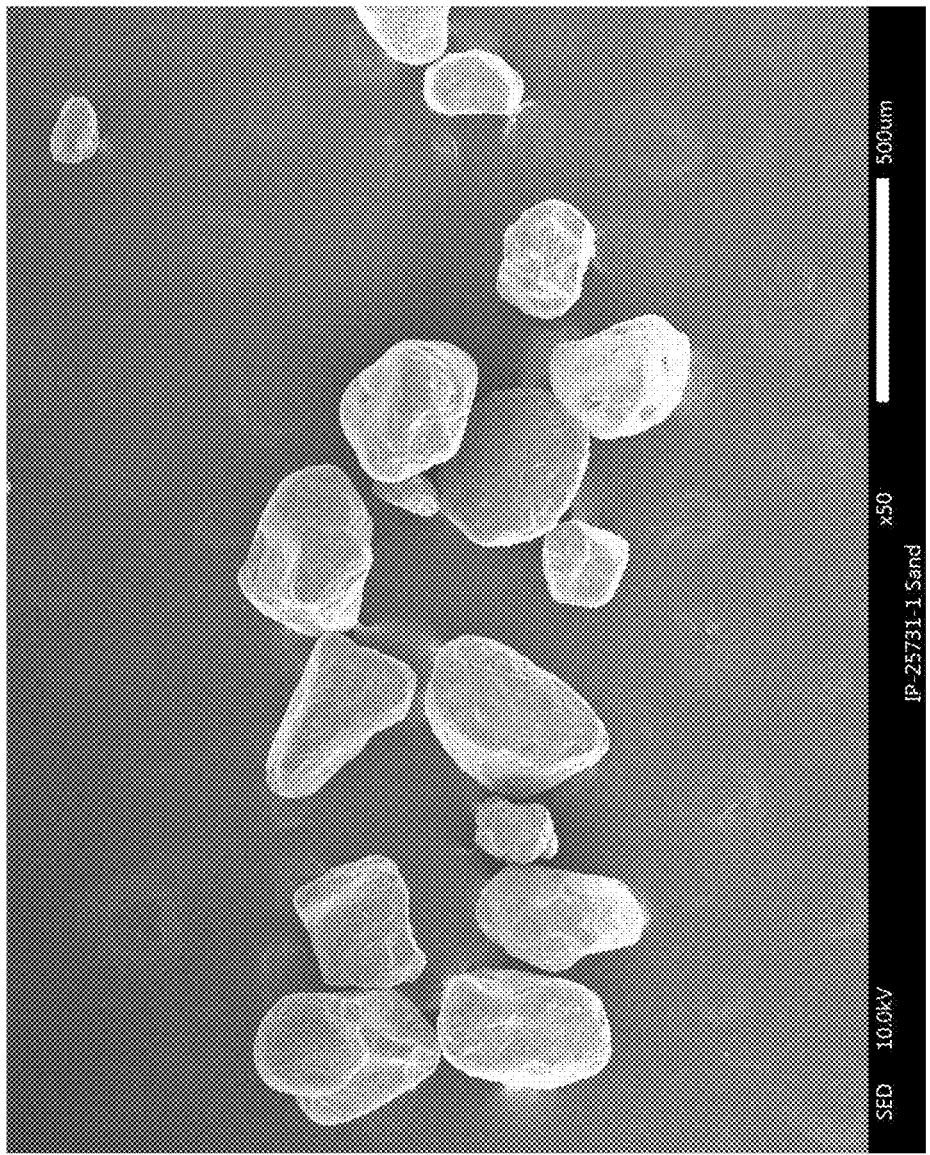
FIG. 14 is a scanning electron microscope (SEM) photograph of an uncoated sand particle.

FIG. 14 shows a photograph of uncoated silica sand taken with a scanning electron microscope (SEM) at 50× magnification.

Figure 15:
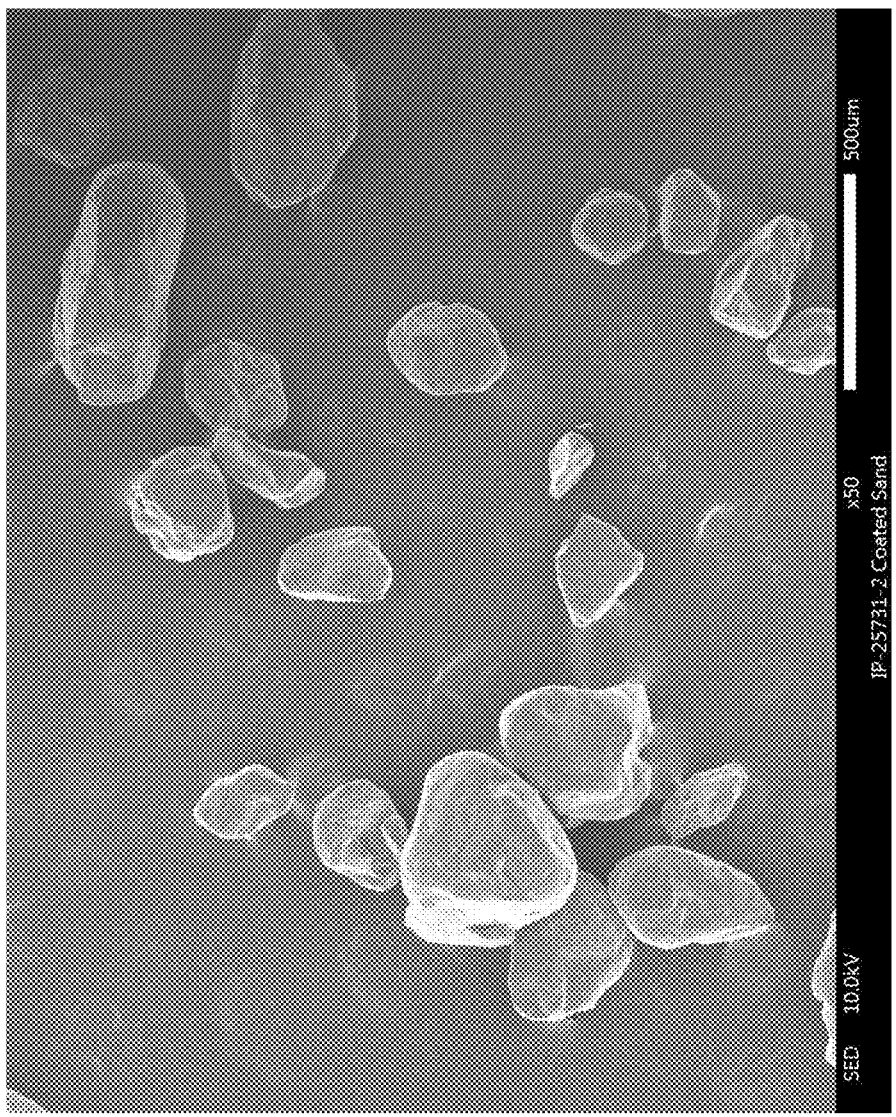
FIG. 15 is an SEM photograph of a coated silica sand particle.

FIG. 15 shows an SEM photograph of the PERMA-COLOR HP FINE WHITE urethane coated sand used to form the Second Control composition, at 50× magnification.

Figure 16:
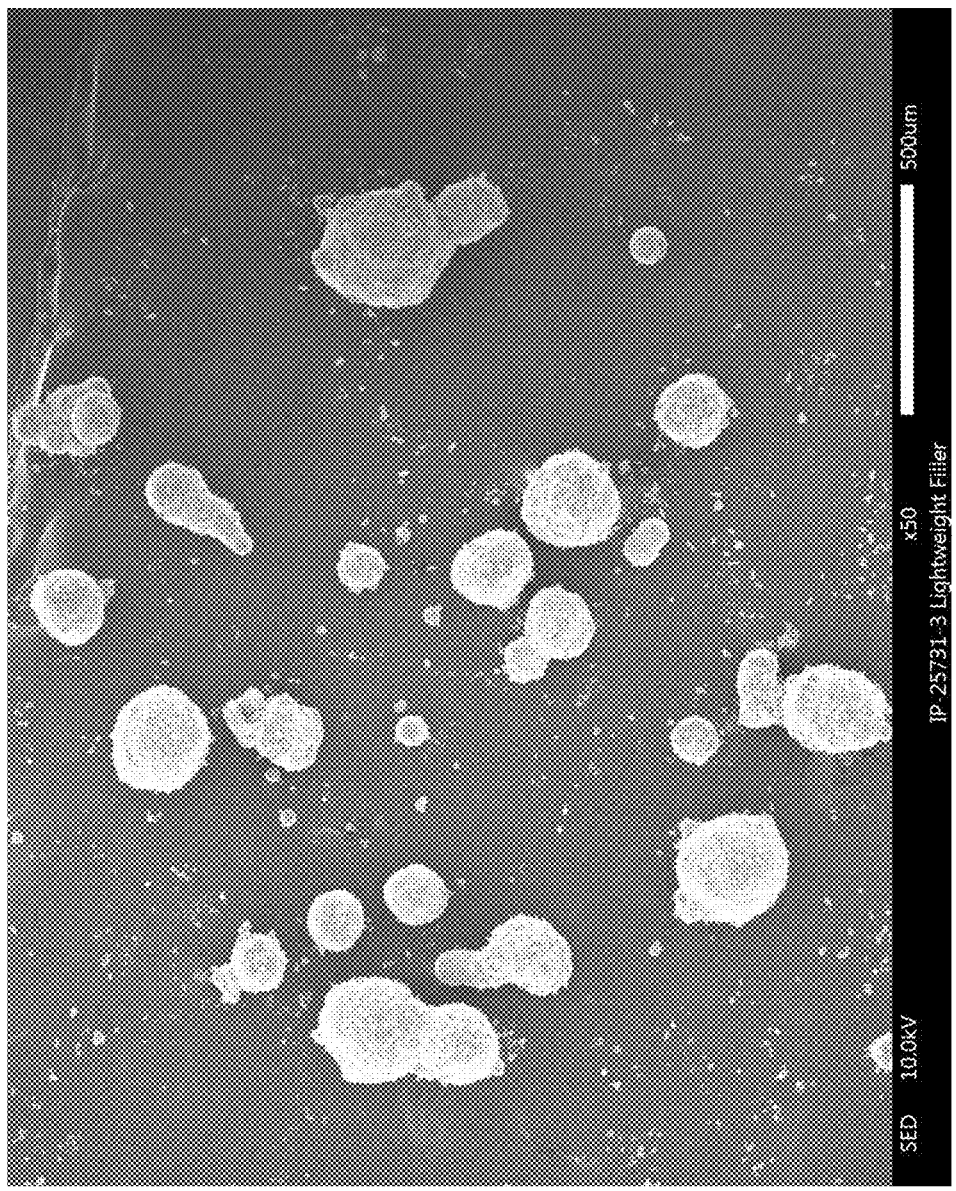
FIG. 16 is an SEM photograph of an uncoated microsphere.

FIG. 16 shows an SEM photograph of the uncoated microparticles (Poraver X microspheres) of Example 6, at 50× magnification.

Figure 17:
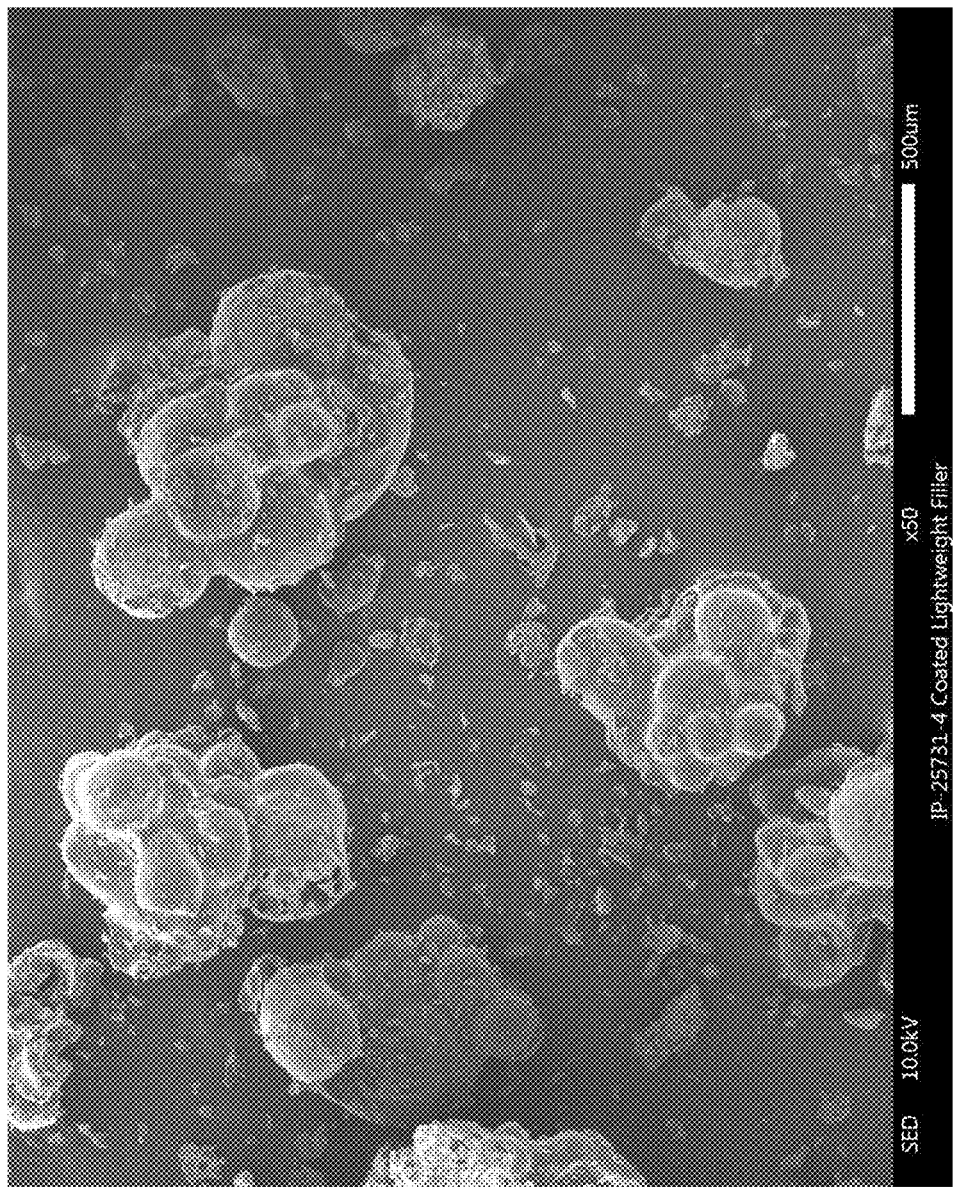
FIG. 17 is an SEM photograph of a coated microsphere, in accordance with certain embodiments.

FIG. 17 shows an SEM photograph at 50× magnification of coated microparticles (Poraver X microspheres) having one coat of the epoxy coating composition set forth in Table 3 above.

Figure 18:
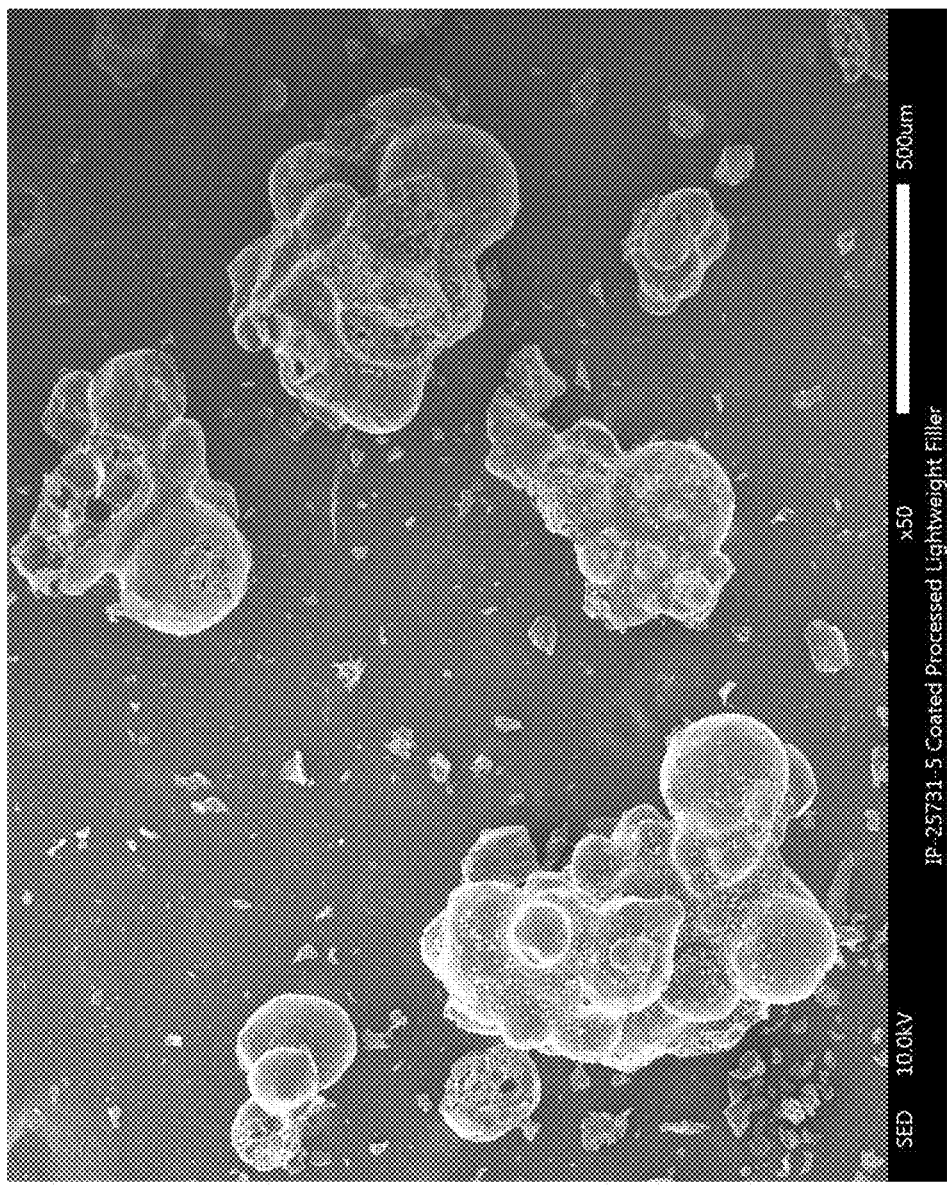
FIG. 18 is an SEM photograph of a coated microsphere, in accordance with certain embodiments.

FIG. 18 shows an SEM photograph at 50× magnification of coated microparticles (Poraver X microspheres) having two coats of the epoxy coating composition set forth in Table 3 above.

TABLE 4

Example Colored Compositions

| Second Resin system | Second Control (Coated Sand) | | Example 6 (Uncoated Microspheres) | | Example 7 (Coated Microspheres) | |
|---|---|---|---|---|---|---|
| | Wt. % | Wt. (grams) | Wt. % | Wt. (grams) | Wt. % | Wt. (grams) |
| First acrylic polymer emulsion | 4.00 | 40.00 | 8.95 | 40.00 | 8.95 | 40.00 |
| Second acrylic polymer emulsion | 16.00 | 160.00 | 35.79 | 160.00 | 35.79 | 160.00 |
| Wetting agent | 0.10 | 1.00 | 0.22 | 1.00 | 0.22 | 1.00 |
| Water | 0.61 | 6.10 | 1.36 | 6.10 | 1.36 | 6.10 |
| Ethyl silicate | 0.30 | 3.00 | 0.67 | 3.00 | 0.67 | 3.00 |
| Zinc stearate | 0.48 | 4.80 | 1.07 | 4.80 | 1.07 | 4.80 |
| Biocide (antimicrobial) | 0.10 | 1.00 | 0.22 | 1.00 | 0.22 | 1.00 |
| Ester alcohol | 0.80 | 8.00 | 1.79 | 8.00 | 1.79 | 8.00 |
| Polyethylene glycol | 0.30 | 3.00 | 0.67 | 3.00 | 0.67 | 3.00 |
| Water | 0.79 | 7.90 | 1.77 | 7.90 | 1.77 | 7.90 |
| Hydroxyethylcellulose | 0.03 | 0.28 | 0.06 | 0.28 | 0.06 | 0.28 |
| Surfactant | 0.05 | 0.50 | 0.11 | 0.50 | 0.11 | 0.50 |
| Fluorosurfactant | 0.03 | 0.30 | 0.07 | 0.30 | 0.07 | 0.30 |
| Thixotropic thickener | 0.10 | 1.00 | 0.22 | 1.00 | 0.22 | 1.00 |
| Biocide (fungicide) | 0.02 | 0.20 | 0.04 | 0.20 | 0.04 | 0.20 |
| Wollastonite microfiber Filler Component | 1.00 | 10.00 | 2.24 | 10.00 | 2.24 | 10.00 |
| Coated sand (Permacolor HP BC Fine White) | 75.3 | 752.9 | | | | |
| Coated Poraver X | | | | | 44.73 | 200.0 |
| Uncoated Poraver X | | | 44.73 | 200.0 | | |
| Viscosity (HBT/TC/5) | 22 | | 14 | | 23 | |
| 24 Hr Viscosity (HBT/TC/5) | 50 | | 20 | | 39 | |
| Density lb/gal | 15.31 (1.83 kg/L) | | 8.06 (0.97 kg/L) | | 8.11 (0.97 kg/L) | |

Various modifications and additions can be made to the exemplary embodiments discussed without departing from the scope of the present invention. For example, while the embodiments described above refer to particular features, the scope of this invention also includes embodiments having different combinations of features and embodiments that do not include all of the above-described features.

What is claimed is:

1. A grout comprising:
   a resin system; and
   a colorized filler comprising particles comprising a polymer, the particles having a density less than 2.6 g/cc and an average particle size from 100 microns to 600 microns.

2. The grout of claim 1, wherein the particles have a density less than 2.0 g/cc.

3. The grout of claim 1, wherein the system comprises a liquid polymeric binder.

4. The grout of claim 1, wherein the resin system comprises a two-part epoxy, a two-part polyurethane, or a combination thereof.

5. The grout of claim 1, wherein the resin system comprises a reactive binder.

6. The grout of claim 1, wherein the resin system comprises at least one from the group of epoxy, polyurethane, and polyacrylate.

7. The grout of claim 1, wherein the colorized filler comprises at least one from the group of plastic, rubber, latex, and vinyl.

8. The grout of claim 1, wherein the colorized filler comprises at least one from the group of polyester, polycarbonate, and polyacrylate.

9. The grout of claim 1, wherein the colorized filler comprises at least one from the group of polyethylene terephthalate, polyvinyl chloride, high density polyethylene, low density polyethylene, polypropylene, polystyrene, acrylonitrile butadiene, acrylonitrile butadiene styrene, fiberglass, and nylon.

10. The grout of claim 1, wherein the density of the grout is less than 1.6 kg per liter.

11. The grout of claim 1, wherein the density of the grout is less than 1.5 kg per liter.

12. The grout of claim 1, wherein the density of the grout is less than 1.4 kg per liter.

13. The grout of claim 1, wherein the colorized filler is present in an amount from 10 percent to 70 percent by weight of the grout.

* * * * *